United States Patent
Vetter

[11] Patent Number: 5,534,954
[45] Date of Patent: Jul. 9, 1996

[54] MOTION PICTURE SYSTEM

[75] Inventor: Richard Vetter, Pacific Palisades, Calif.

[73] Assignee: United Artists Theatre Circuit, Inc., West Los Angeles, Calif.

[21] Appl. No.: 221,036

[22] Filed: Mar. 31, 1994

Related U.S. Application Data

[63] Continuation-in-part of Ser. No. 807,056, Dec. 2, 1991, abandoned.

[51] Int. Cl.$^6$ ............................................. G03C 1/76
[52] U.S. Cl. .......................... 352/79; 352/168; 352/241
[58] Field of Search .......................... 352/168, 241, 352/79

[56] References Cited

U.S. PATENT DOCUMENTS

| | | |
|---|---|---|
| 1,032,172 | 7/1912 | Zollinger. |
| 1,245,755 | 11/1917 | Mehfelder. |
| 1,255,288 | 2/1918 | Brixey. |
| 1,801,061 | 4/1981 | Thornton. |
| 1,819,541 | 2/1925 | Carleton. |
| 1,966,503 | 9/1929 | Hunter. |
| 2,077,792 | 4/1937 | Lane. |
| 3,143,033 | 1/1955 | Shearer. |
| 3,165,969 | 10/1955 | Gunn. |
| 3,482,909 | 9/1967 | Becker ............................ 352/79 |
| 3,583,803 | 6/1971 | Cole. |
| 3,637,297 | 1/1972 | Yoshida. |
| 3,682,540 | 8/1972 | Oxberry. |
| 3,751,144 | 8/1973 | Greger. |
| 3,865,738 | 2/1975 | Lente. |
| 4,128,320 | 12/1978 | Cecchini ............................ 353/120 |
| 4,306,781 | 12/1981 | Mosely. |
| 4,600,280 | 7/1986 | Clark. |
| 4,900,293 | 2/1990 | McLendon ............................ 474/152 |
| 5,312,304 | 5/1994 | Vetker ............................ 470/160 |

OTHER PUBLICATIONS

"Major Motion Picture Production Standards" by Kennel et al pp. 985–990 of SMPTE Journal, Dec., 1988.

Primary Examiner—Michael L. Gellner
Assistant Examiner—Matthew Miller
Attorney, Agent, or Firm—Freilich Hornbaker Rosen

[57] ABSTRACT

A new 35 mm motion picture film is described which maximizes usage of film stock, and which facilitates acceptance by motion picture theater owners. Acceptance is facilitated by minimizing the cost for projector head conversion and by assuring at least present image quality. The new motion picture format (12, FIG. 4) has film frames (20) of substantially the same size (22, 24) as the mask aperture (H) of the current Wide Screen Academy Format, and uses the same size and spacing of sprocket holes, or film perforations. However, the film frames are spaced apart by a distance (26) that is a noninteger number of perforations, with the spacing being 2.5 perforations in a preferred format (12). A current projector head is converted for showing the new format, by providing new sprocket wheels (14, FIG. 5) with ten teeth, that mount on the same shafts of the projector head as current sprocket wheels that have sixteen teeth.

15 Claims, 13 Drawing Sheets

2½ PERF./FRAME

4 PERF./FRAME

2½ PERF./FRAME

16 TEETH

10 TEETH

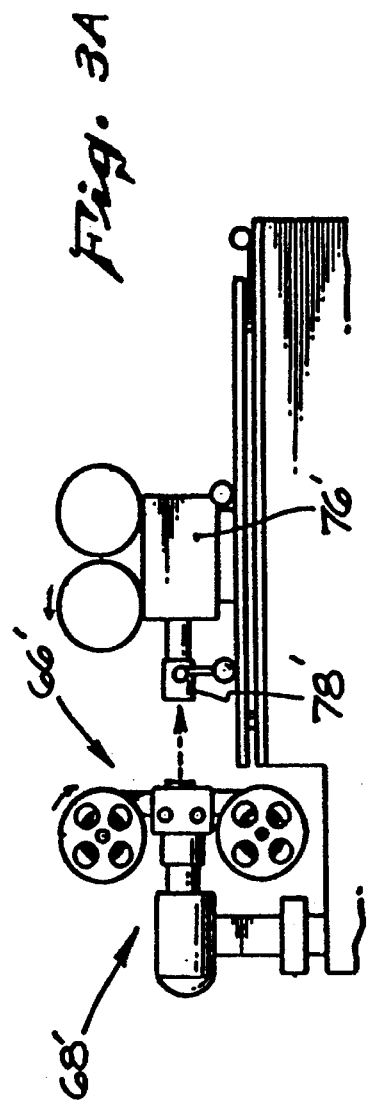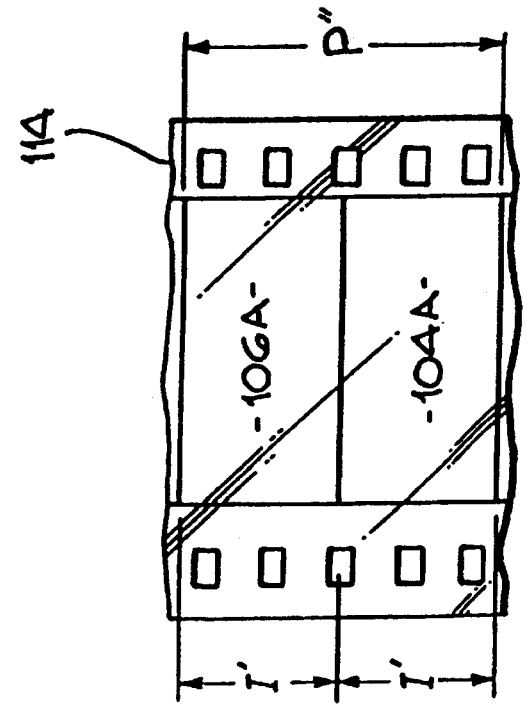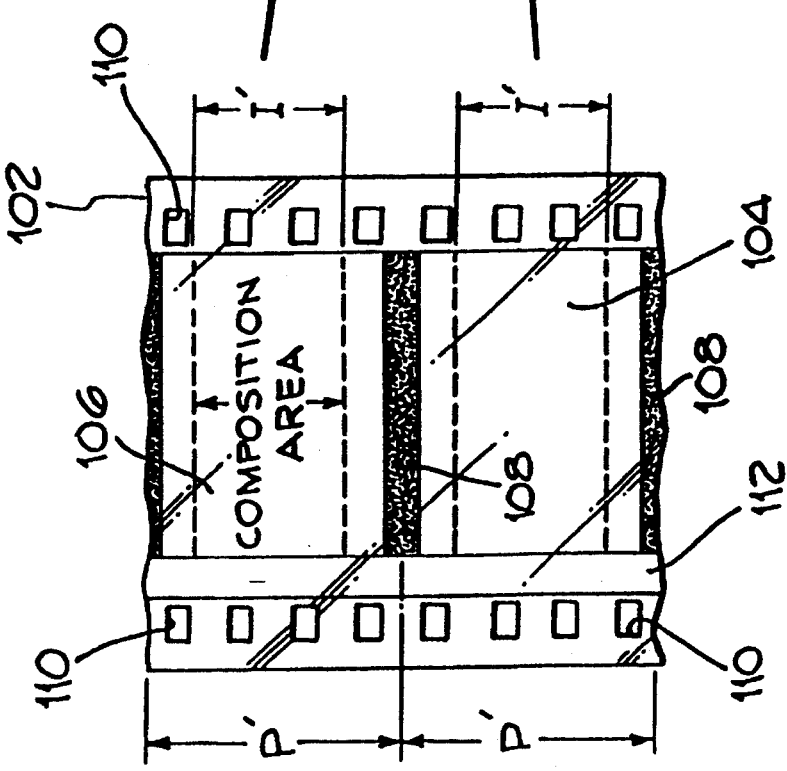

2¾ SP/FR

11 TEETH

2¼ SP/FR

9 TEETH

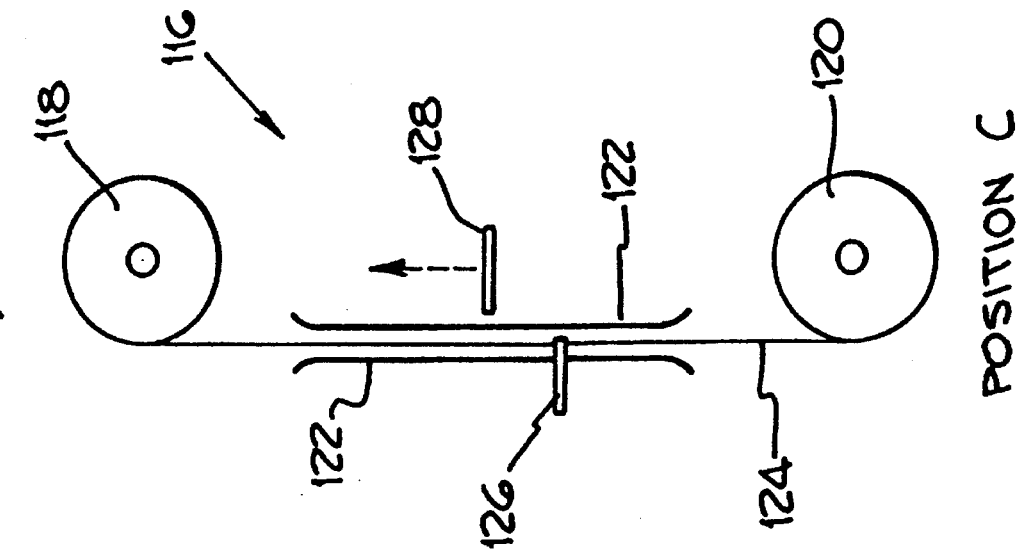
Fig. 14. POSITION C
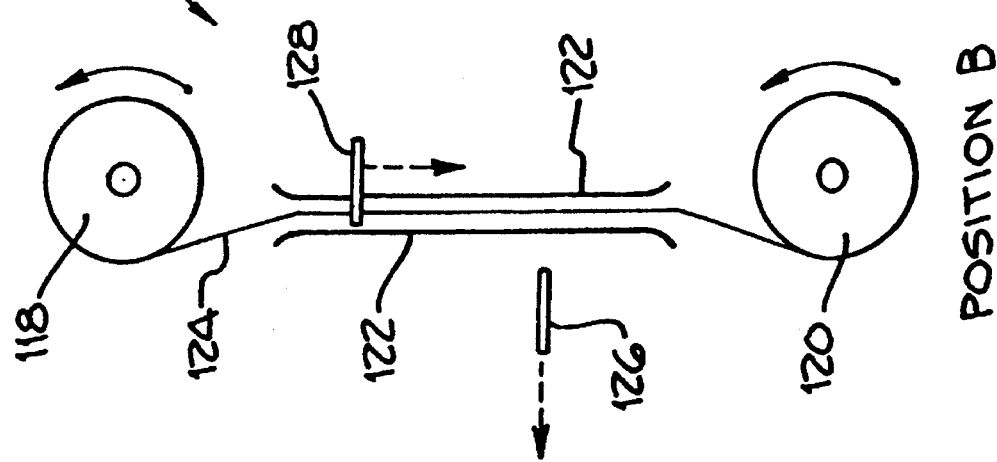
Fig. 13. POSITION B
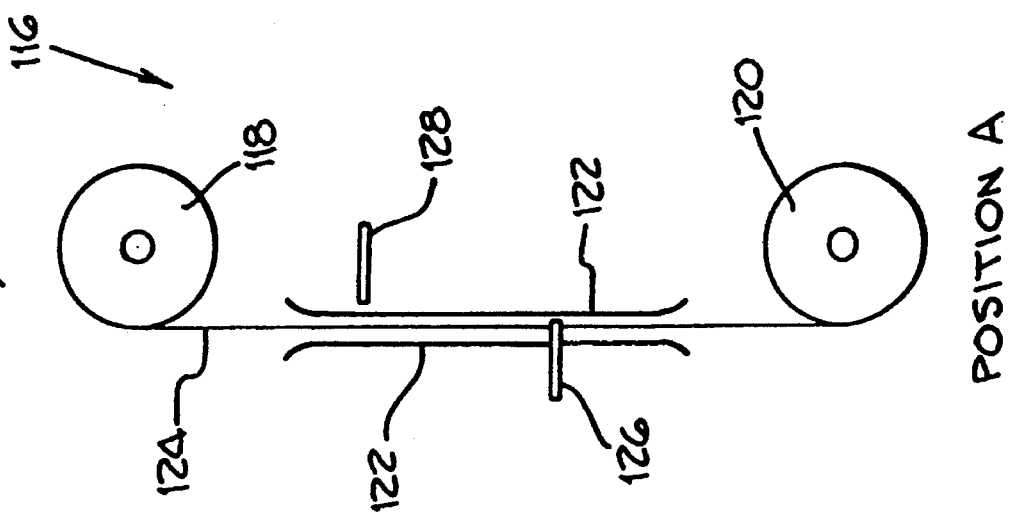
Fig. 12. POSITION A

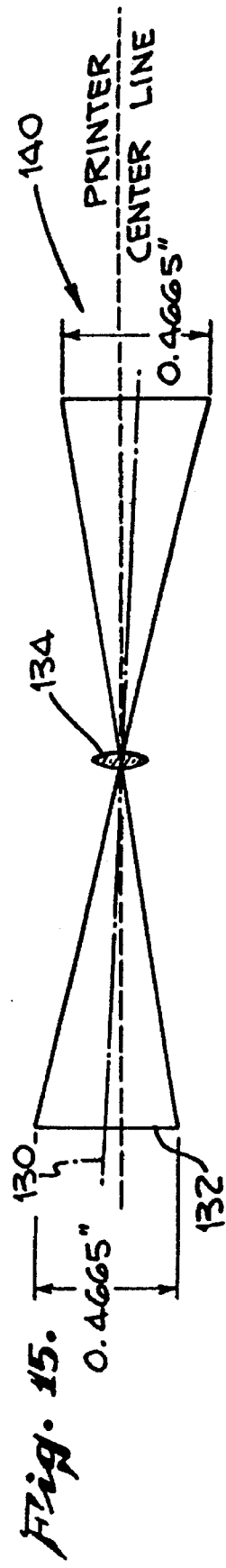
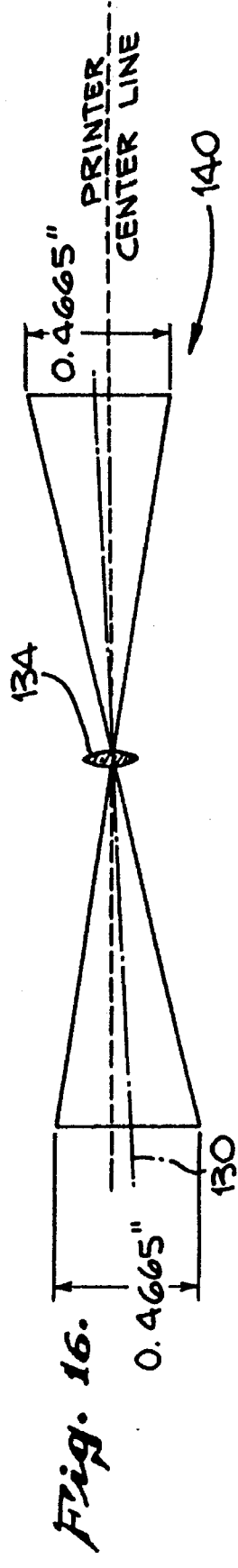
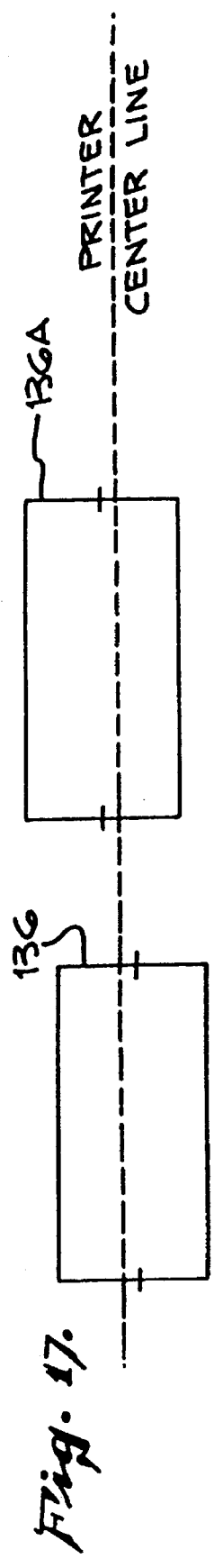
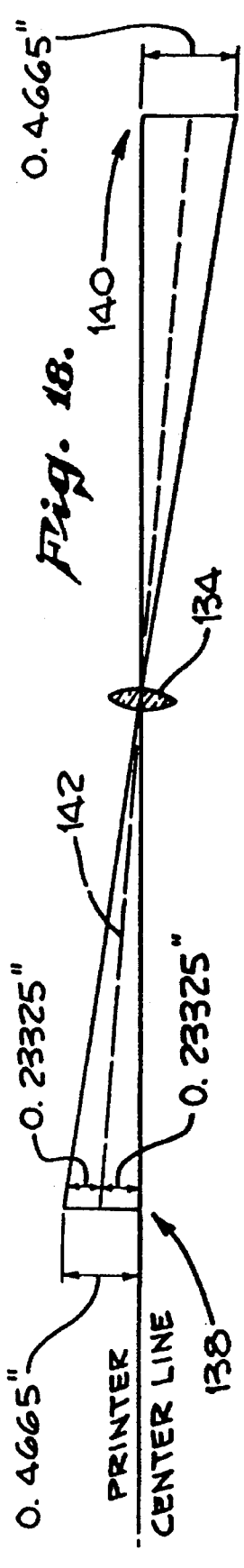

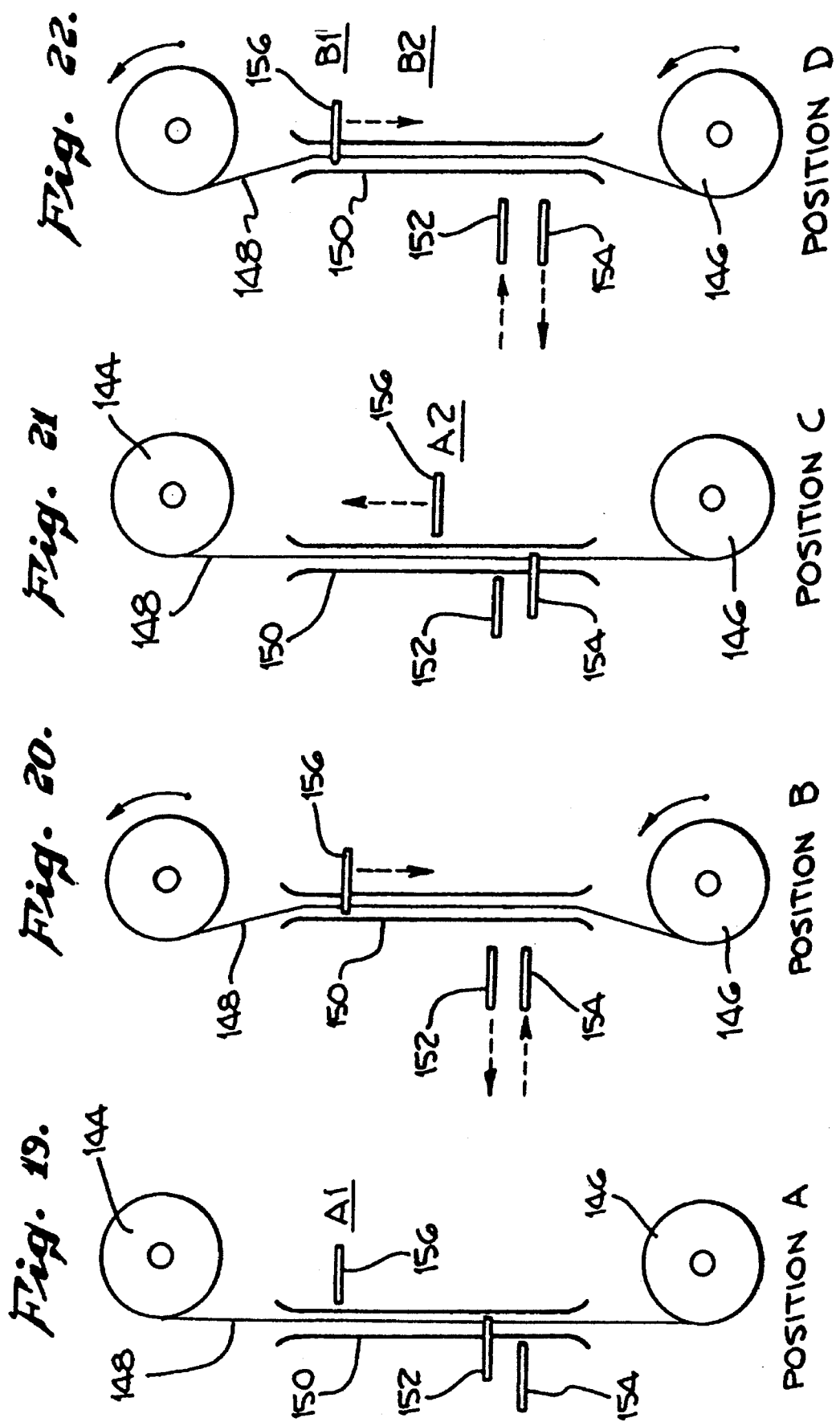

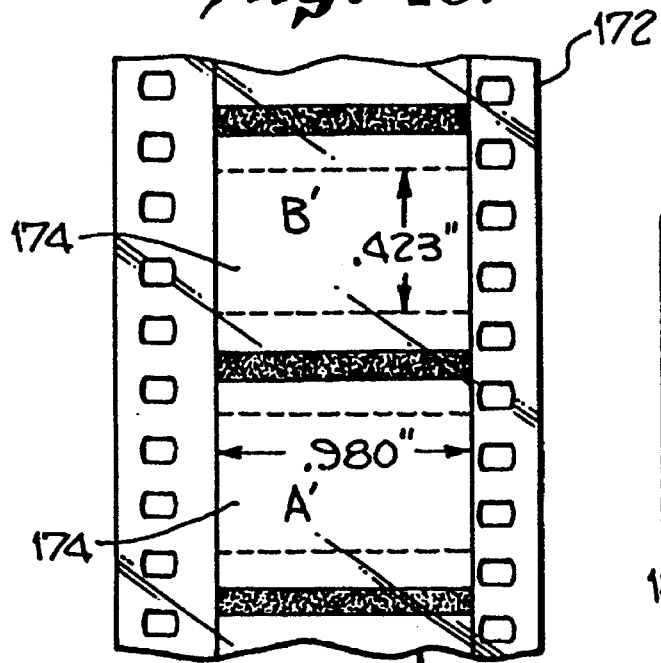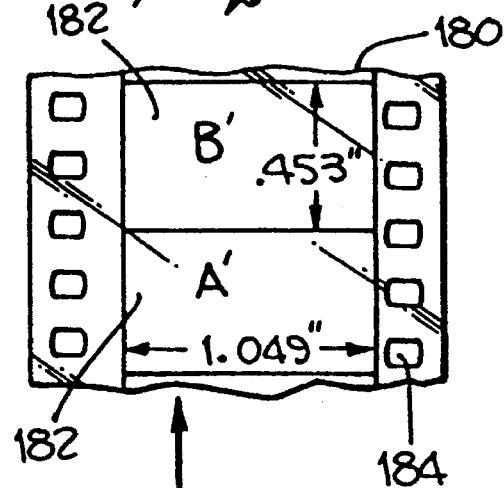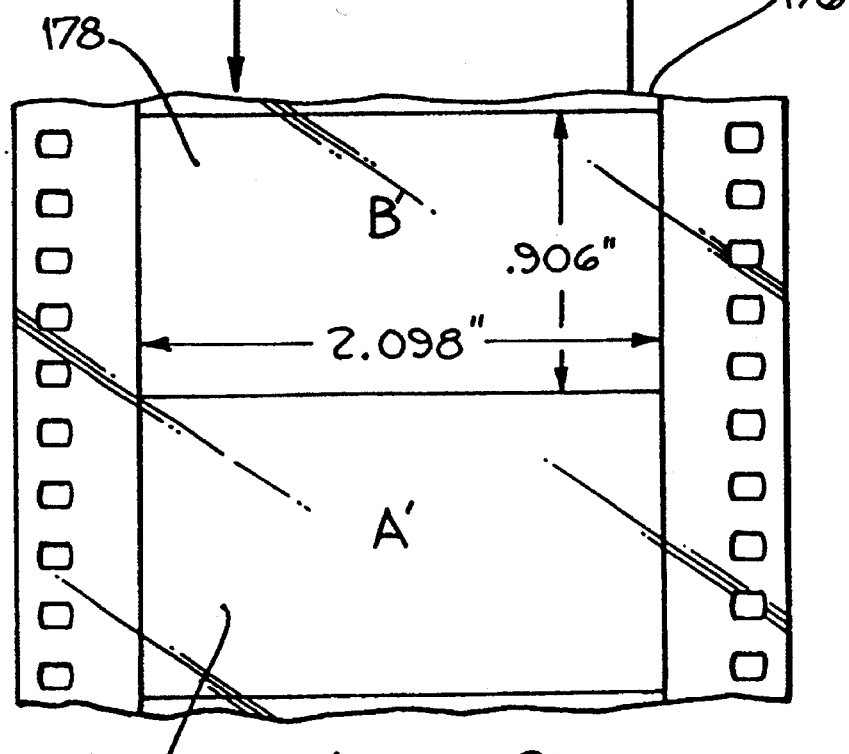

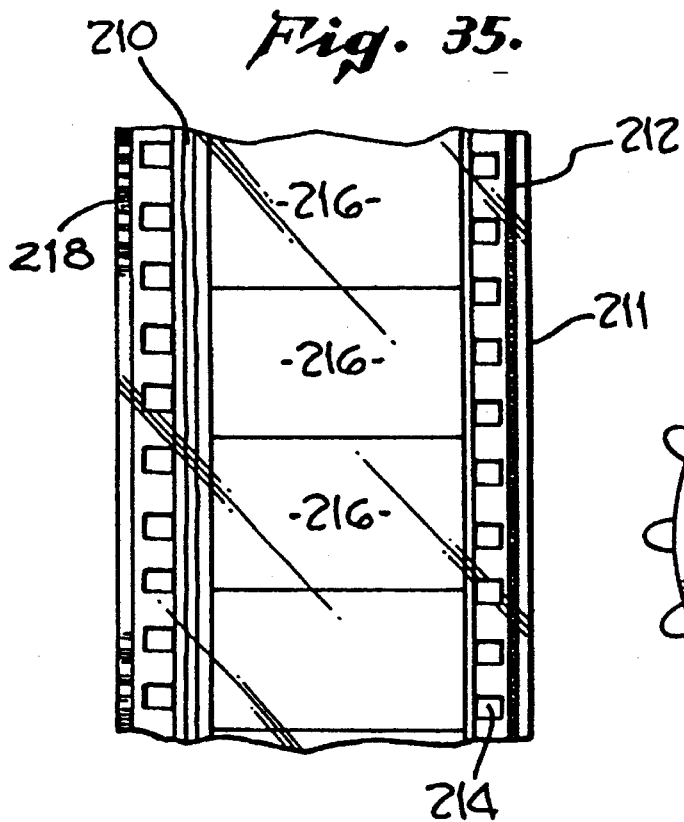
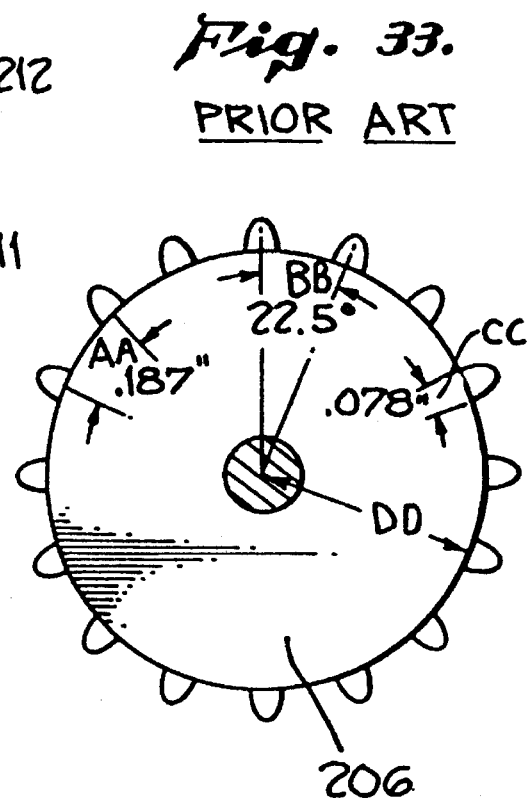
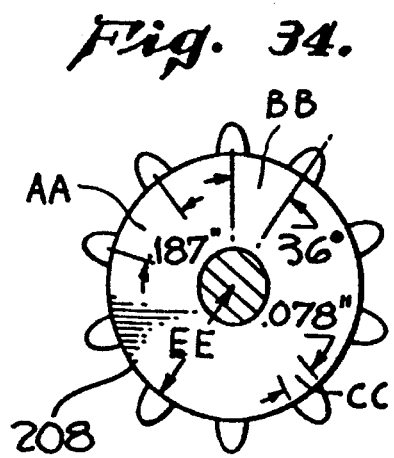
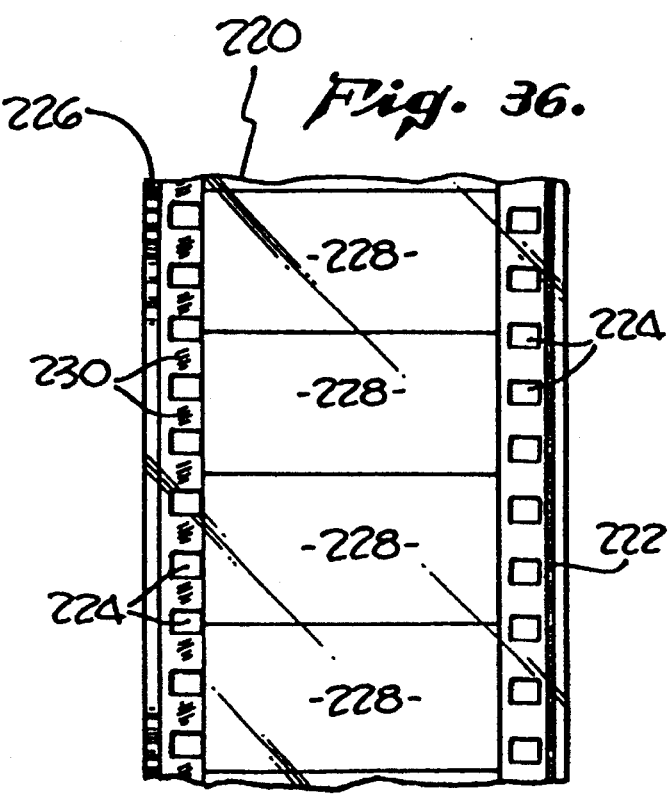

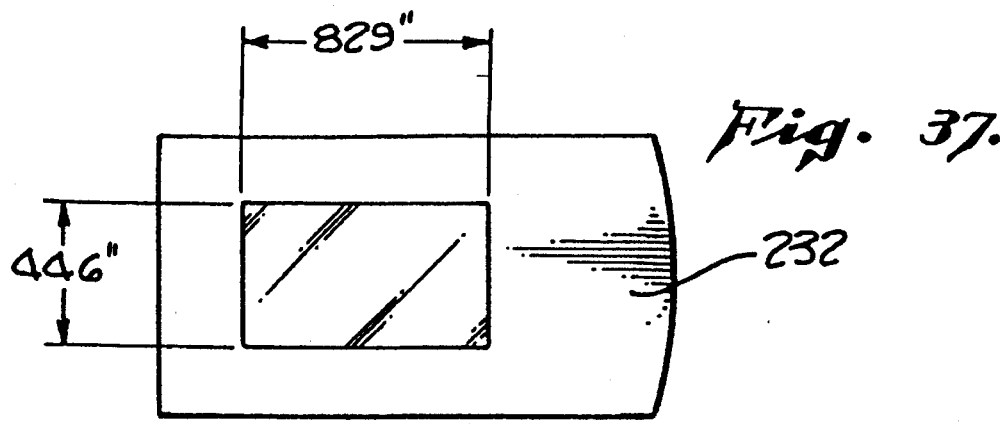
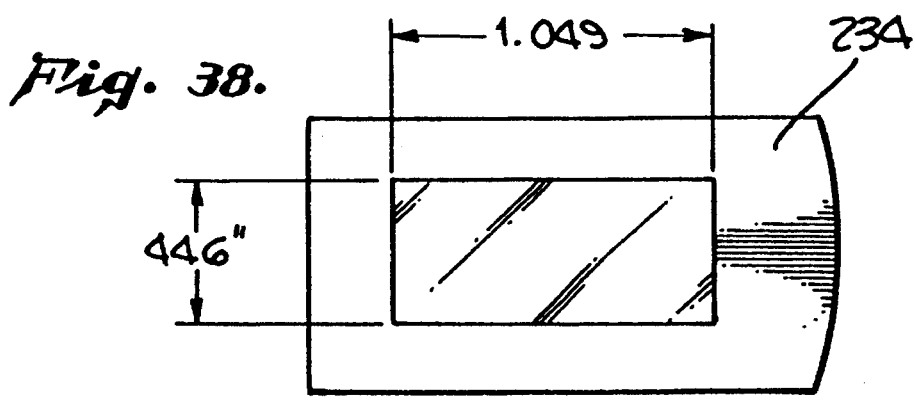
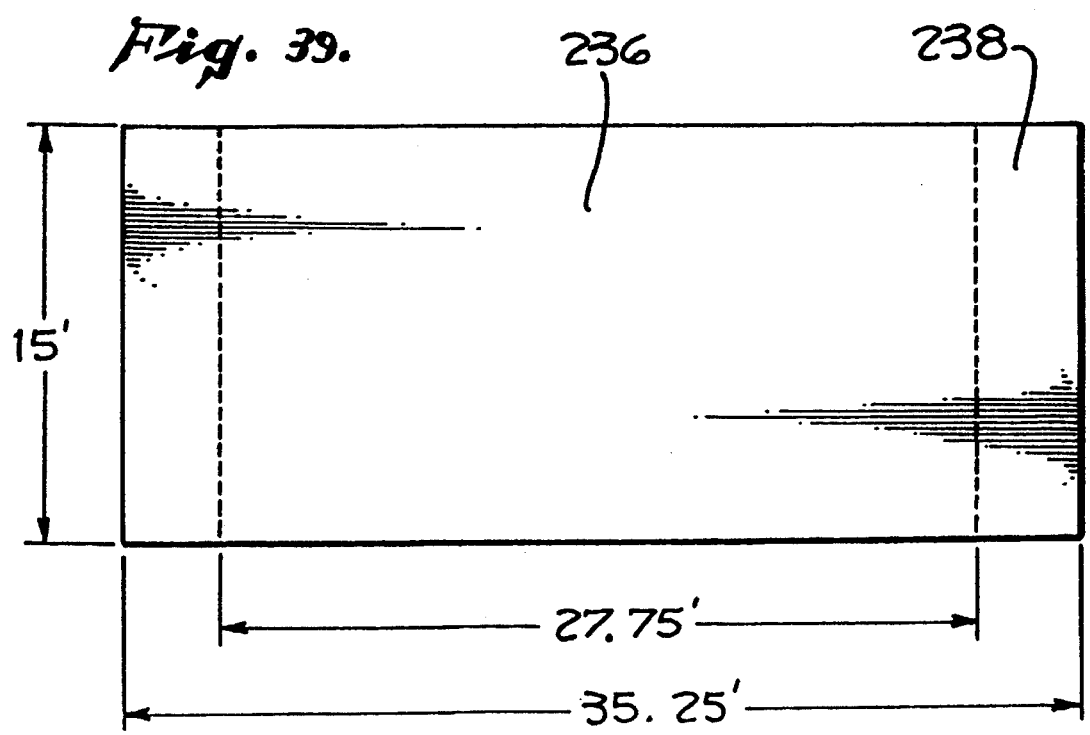

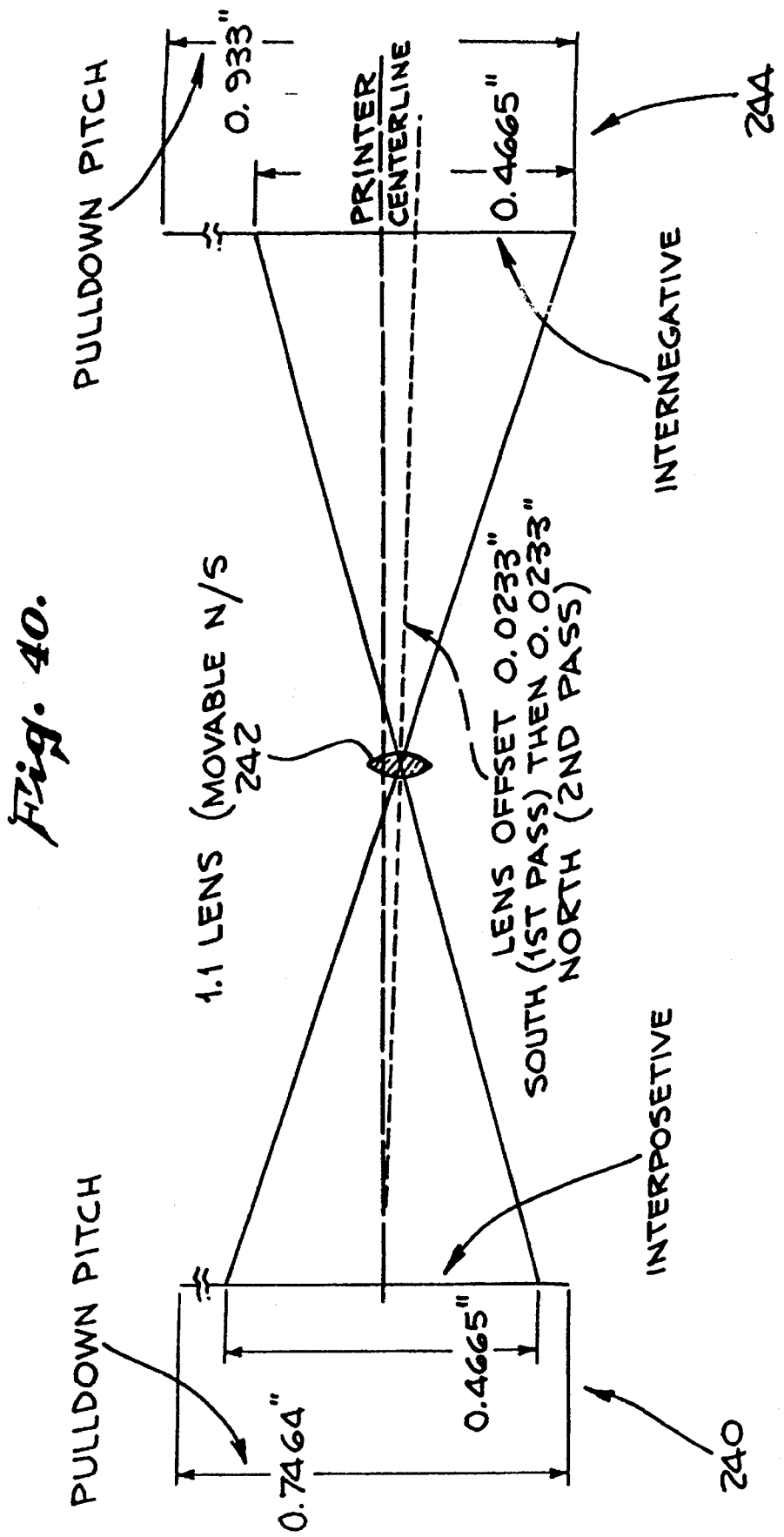

5,534,954

MOTION PICTURE SYSTEM

This is a continuation-in-part of U.S. patent application Ser. No. 07/807,056 filed Dec. 12, 1991, now abandoned.

BACKGROUND OF THE INVENTION

In the 1880's, an Academy Standard film format was created, wherein the film stock had two rows of sprocket holes, or film perforations, each film frame had an aspect ratio (width divided by height) of 1.37:1, and the film frames were spaced apart by four perforations (0.748 inch). This format was widely adopted in the 1920's. In the 1950's, a new projection aspect ratio called Wide Screen Academy Format was adopted, wherein the same film was used, but the aperture of the projector film gate was changed so the projected image had a smaller length, or height, than previously, for an aspect ratio of 1.85:1. It was thought that the wider format would differentiate the motion picture images from television images. However, the film frames were still of the same size and still spaced apart by four perforations, with the top and bottom of each frame cropped to produce an aspect ratio of 1.85. As a result, the gap or space between the projected areas of adjacent film frame occupied about 40% of the length of the film stock. The film titles were centered on the film frames, to aid the projectionist to adjust the framing knob so the center of the film frames lay at the center of the projection aperture of the film gate mask.

It would appear that the reason why the Wide Screen Academy Format was readily accepted by theater owners was that about the only change to the projector was to install a new film gate mask and to replace the lens. This current format has been in use up to the present, for more than 90% of all release prints. A small number of release prints are in the Cinemascope format, wherein the same film stock is used, but the film frames have a greater width.

There have been suggestions for minimizing the amount of film used. For example, U.S. Pat. Nos. Butler 3,565,521 and Cole 3,583,803 suggest the use of projection apertures (of the film gate mask) of smaller heights and different aspect ratios to save the amount of film used when standard 35 mm film stock is used. However, because of competition from television and aversion to any change that would degrade the motion picture image, there is reluctance to accept a smaller projection aperture size.

Lente U.S. Pat. No. 3,865,738 suggests the use of the current projection aperture, with film frames of smaller height and spaced apart by only three sprocket holes to minimize wastage. Although this would result in reducing film "wastage" from about 40% to 20%, this format has not been adopted. A new film format that used current 35 mm film stock and the current projection aperture size, and which virtually eliminated film "wastage", while facilitating conversion of projectors to the new format, would be more readily accepted by the motion picture film industry.

SUMMARY OF THE INVENTION

In accordance with one embodiment of the present invention, a method and apparatus provide a motion picture film format that greatly reduces the amount of required film stock, while encouraging theater owners to accept the new format. The new film format uses standard 35 millimeter film stock with the standard rows of sprocket holes, or perforations, and uses film frames that are substantially as wide as those of the current Academy Format. However, the spacing between frames is a noninteger number of sprocket holes, such as 2.5 sprocket holes. In addition, a relatively low cost modification of common theater motion picture projectors is made, by substituting replacement sprocket wheels for the current sprocket wheels. While most current sprocket wheels have sixteen sprocket teeth per 360° (i.e. per revolution), the replacement sprocket wheels have fewer (but a whole number) sprocket teeth per 360°. The sprocket wheels are preferably readily interchangeable with sixteen tooth sprocket wheels, so the theater owner can readily switch between the current Wide Screen Academy Format and the new format of the present invention.

In a preferred embodiment of the invention, the film frames are spaced apart by two and one-half perforations. This results in virtually all of the film stock length being occupied by film frames of substantially the present projection aperture size. In addition, projector conversion is simplified because the current sixteen tooth sprocket wheels can be replaced by ten tooth sprocket wheels.

The novel features of the invention are set forth with particularity in the appended claims. The invention will be best understood from the following description when read in conjunction with the accompanying drawings.

BRIEF DESCRIPTION OF THE DRAWINGS

FIG. 3A is a side elevation and schematic view of a film printing mechanism for use in the present invention.

FIG. 10A is a plan view of a segment of a current film, similar to that of FIG. 1.

FIG. 11 is a plan view of a segment of a film of the present invention, similar to that of FIG. 4.

FIG. 12 is a schematic representation of a film transport for an optical printer camera head, according to one aspect of the present invention.

FIG. 13 is a schematic representation of a film transport for an optical printer camera head depicting film pull-down.

FIG. 14 is a schematic representation of a film transport for use in an optical printer camera head showing insertion of registration pins prior to exposure of the film.

FIG. 15 is a schematic representation of the orientation of the film images and the optics used in the film printer according to one aspect of the present invention.

FIG. 16 is a schematic representation of the image orientation and optical film printer according to one aspect of the present invention for use in a second pass of the film.

FIG. 17 is a schematic representation of the printer camera head aperture relative to the printer centerline for first and second film passes.

FIG. 18 is a schematic representation of the image orientation and optics for an optical printer according to a further aspect of the present invention.

FIG. 19 is a schematic representation of a film transport for an optical printer camera head according to a further aspect of the present invention.

FIG. 20 is a schematic representation of a film transport for an optical printer camera head showing pull-down for film transport.

FIG. 21 is a schematic representation of a film transport mechanism for an optical printer camera head showing the use of registration pins.

FIG. 22 is a schematic representation of a film transport for an optical printer camera head showing a further step of film pull-down.

FIG. 28 is a plan view of a segment of conventional Scope formatted film to be used in the consolidation process according to a further aspect of the present invention.

FIG. 29 is a plan view of a segment of 65 mm film with the usable images taken from the film of FIG. 28 enlarged by 2.141.

FIG. 30 is a plan view of a segment of motion picture film according to the present invention showing the images consolidated from the 65 mm film of FIG. 29 reduced by a factor of two.

FIG. 33 is a side elevation view of a film transport sprocket for use with conventional film transport systems.

FIG. 34 is a side elevation view of a film transport sprocket for use with the projector of FIG. 32.

FIG. 35 is a plan view of a segment of motion picture release print film in the Wide Screen format according to the present invention.

FIG. 36 is a plan view of a segment of motion picture release print film in the Scope format according to the present invention.

FIG. 37 is an elevation view of a projector aperture for use with the film according to the present invention for Wide Screen format.

FIG. 38 is an elevation view of a projector aperture for use with the present invention for Scope format film.

FIG. 39 is a front elevation view of a typical projection screen showing the Wide Screen and Scope dimensions.

FIG. 40 is a schematic representation of the orientation of film images and the optics used in a film printer according to a further aspect of the present invention.

DESCRIPTION OF THE PREFERRED EMBODIMENTS

1. Film Formats and Projector Conversion

Figure 1:
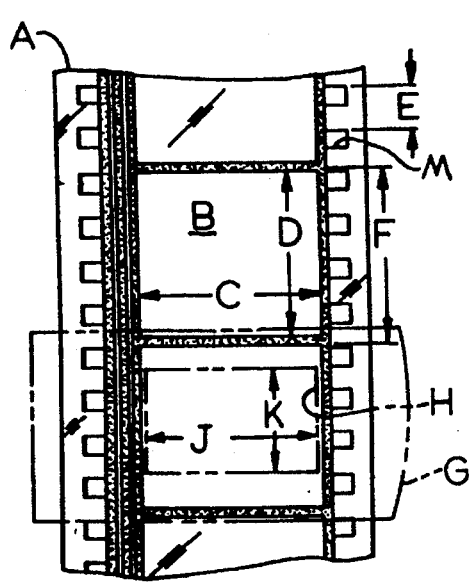
FIG. 1 is a front elevation view of the prior art, but currently used, Academy Format.

FIG. 1 illustrates the film format A called Academy Standard, which has been generally used for commercial theater release prints between the 1920's and the present, and which is currently in use for over 90% of theater release prints. Each film frame B has a width C of 0.868 inch and a length or height D of 0.715 inch. The film stock has two rows of sprocket holes or perforations M, with a center-to-center perforation distance E of substantially 0.187 inch (shrinking or expansion can change this slightly, usually by less than 1%). The film frames B are spaced apart by a distance F of four perforations, or 0.748 inch. Each film frame B has an aspect ratio (width C to height D) of 1.37:1. Until the 1950's, almost the entire height D and width C were projected on the screen, by the use of a projection aperture of slightly smaller height and width than the film frames.

In the 1950's, competition from television resulted in the motion picture industry adopting a new aspect ratio which is called the Wide Screen Academy Format. This was accomplished by using a new film gate mask G with a projection aperture H of the same width J of 0.825 inch as previously, but which had a smaller height K of 0.446 inch. The top and bottom of each film frame is cropped (not projected). The projection aperture and projected image each has an aspect ratio of 1.85:1. It was thought that this aspect ratio would further distinguish motion picture films from television (video). It is noted that motion picture cameras continue to use the format A of FIG. 1, which is the current television format.

In the current Academy Format of FIG. 1, the frames are spaced apart by the distance F of four perforations. It is believed that the format A with a different mask projection aperture H was readily accepted by theater owners because it required minimal change to the then-current film projectors. That is, about the only change was to replace the film gate mask, and to replace the lens with one of shorter focal length (to account for the wider screen).

The current format A obviously wastes a lot of film, because the projection aperture (of 0.446 inch height) occupies only 60% of the pull down distance (0.748 inch), so about 40% is "wasted". This waste has been long recognized and there have been many suggestions for avoiding such wastage. However, no format or system has been acceptable. Most suggestions are to use different film stock in different film frame sizes, to take advantage of increases in resolution obtainable with the most modern film stock. However, there is fear in the industry that any reduction in frame size would decrease resolution and screen brightness, and hurt the competitive lead over television. One suggestion (in U.S. Pat. No. 3,865,738 by Lente issued Feb. 11, 1975) is to space the frames by three sprocket holes, or perforations, instead of four, which would mean that only about 20% of the film would be wasted and 80% would be used. This suggestion has not been accepted by the motion picture film industry. A format that used an even greater percentage of the film stock while facilitating conversion of current projectors to the new format, would have an increased chance of acceptance.

Figure 2:
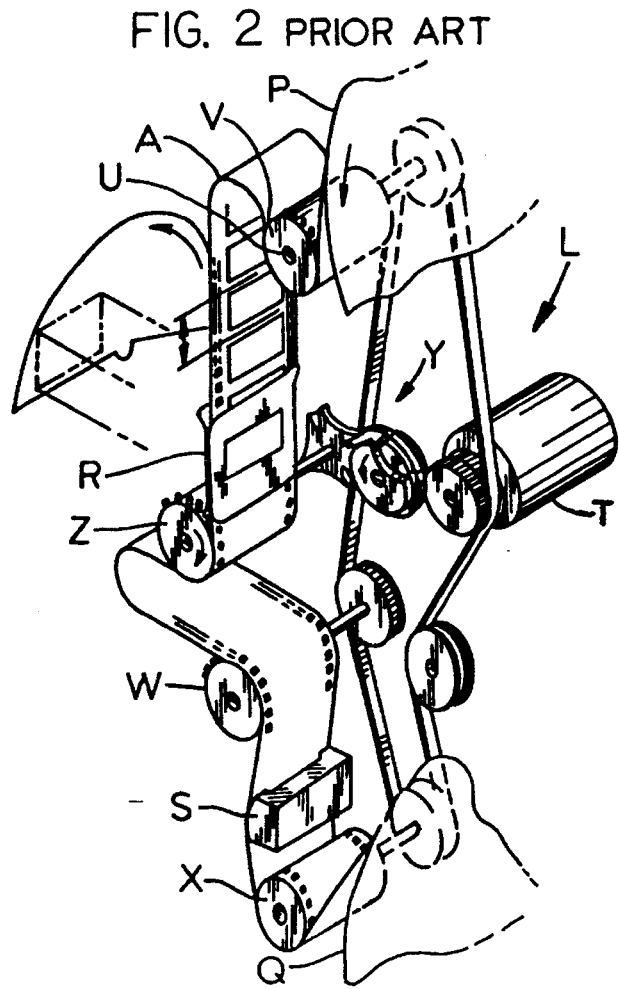
FIG. 2 is a simplified partial isometric view of a commercial motion picture theater projector of the prior art.

In Order for a new format to be acceptable, it should permit low cost conversion of present projectors between the current and new format, and back again, to project both formats. FIG. 2 is a simplified illustration of a commercial motion picture film projector L of a type that is currently in use. The projector passes film A from a supply reel P to a takeup reel Q (the two reels are commonly stacked on one another as platters of a platter system). The film moves through a film gate R (of which the part G is shown in FIG. 1) and past a sound head S, A constant speed motor T is connected through shafts U to several sprocket wheels V, W, X that move the film at a constant speed of ninety feet per minute from the supply reel to the takeup reel. The sprocket wheels turn at a speed of 6 rps. A 4-star Geneva movement Y drives an additional sprocket wheel Z that moves the film intermittently by a distance of 0.748 inch every twenty-fourth of a second, to pull it intermittently through the film gate R.

Applicant has noticed that there is a common sprocket wheel size that is used for almost all sprockets wheels including those V, W, X that turn at a constant speed, and including the pull-down sprocket wheel Z that is turned intermittently. Each of these sprocket wheels has sixteen teeth for each 360° (i.e. it has two sets of sixteen teeth each), and each sprocket wheel is turned by 90° every one twenty-fourth of a second. Applicant modifies the film format to place the film frames closer together but without changing the film stock. Also, applicant replaces the sprocket wheels V, W, X and Z with a new type of sprocket wheel having fewer sprocket teeth.

Figure 4:
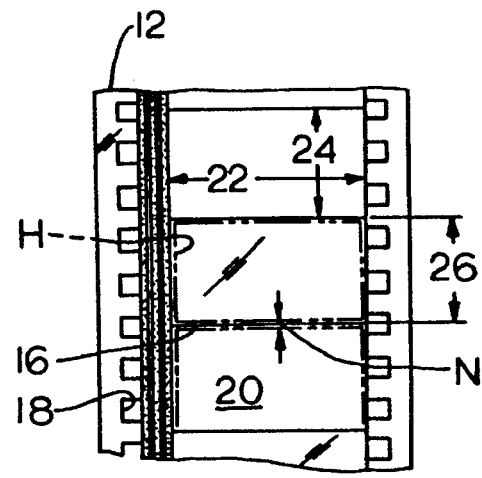
FIG. 4 is a front elevation view of a new motion picture film of a preferred embodiment of the present invention, with film frames spaced apart by 2.5 perforations.
Figure 3:
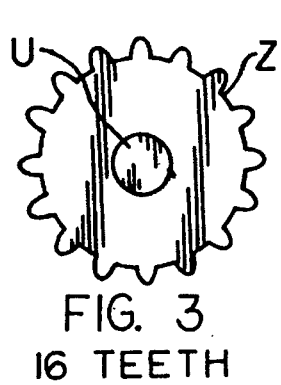
FIG. 3 is a side elevation view of a current sprocket wheel of the projector of FIG. 2.
Figure 5:
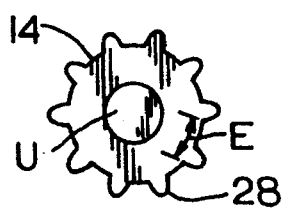
FIG. 5 is a side elevation view of a new sprocket wheel of the present invention which is used with the film format of FIG. 4.

FIGS. 4 and 5 respectively show a new film format 12 that replaces the current format A, and a new sprocket wheel 14 that replaces the current sprocket wheel Z shown in FIG. 3 (which is identical to the other sprocket wheels V, W, and X). In the new format of FIG. 4, the film stock is identical to that of the current format A shown in FIG. 1. The perforations 18 are spaced apart by 0.187 inch. Each film frame 20 has about the same width 22 (0.868 inch) as the current format A. However, each film frame has a much shorter height 24 of about 0.46 inch (usually between 0.446 and 0.4675 inch). The film is designed for use with a film gate projection aperture H of the same width J and height K as is currently used.

For the new format of FIG. 4, the leading edges 16 of the frames 20 are spaced apart by a distance 26 equal to the spacing of two and one-half or 2.5 perforations of the current film stock, or 0.4675 inch. The spacing apart of a pair of film frames is the distance or spacing of their leading edges (or of their centers, or of their trailing edges). The present spacing 26 of the film frames by 2.5 perforations, which is a noninteger number of perforations, results in substantially all of the film being used and substantially none being wasted.

In order to use a current projector with 16 tooth sprocket wheels Z to project applicant's new format 12, the current sprocket wheels are replaced with 10 tooth sprocket wheels to advance the film by 2.5 perforations instead of 4 perforations, every twenty-fourth of a second. Sprocket wheels are not expensive to replace, so that there is only a modest cost in providing the new sprocket wheels 14 (FIG. 5) that each have ten teeth 28 per 360°, and in using them to replace the current sprocket wheels such as Z of FIG. 3, that have sixteen teeth per 360°. The relatively modest cost to the theater owner makes the new format more acceptable to him. Such acceptance is aided by the fact that each film frame 20 has a projection area at H, of the same width and length as is used for the current format A, so the motion picture theater industry need not be concerned with a possible degradation of quality.

In the format 12 of FIG. 4, the distance N between the projected portions at H of adjacent frames is a distance N of 0.0215 inch, i.e. 0.0107 inch at the top and 0.0107 inch at the bottom of each frame. This distance N is 4.6% of the 2.5 perforation pull down distance 26 of 0.4675 inch, or 2.3% at the top and 2.3% at the bottom. About half of this distance N is required to account for the fact that the height K of film mask projection apertures vary slightly, and that a slight margin around the projection aperture is required to assure that portions of adjacent frames will not be projected. Accordingly, it may be said that the present format provides the required margin and that substantially none of the film length is "wasted." It should be realized that each film frame can be made to occupy the entire 0.4675 inch pull-down distance, so there is no line between adjacent frames, and applicant prefers this.

Although applicant changes the format of the release print such as shown at 12 in applicant's FIG. 4, the film format used by the cameraman is likely to be the same as shown at A in FIG. 1, so that frames B of an aspect ratio of 1.37:1 are available for showing on television in the present television format. In both the current format A and the new format 12, the frames of the release print used in the theater projector are of unity magnification of the original frames exposed by the camera; that is, all objects in each frame are of the same size in the release print as on the camera negative. Although the middle portions of the camera negative frames are substantially identical to those of the new release print (except one is a negative and one is a positive), the camera frames are spaced by the traditional integer number (4) times the sprocket hole spacing, rather than by a new noninteger number (2.5).

If applicant's new format and replacement sprocket wheels are accepted, there will be a transition period during which films of the new format shown at 12 in FIG. 4, are available to theater owners at the same time as films of the current format shown at A in FIG. 1. A projectionist can convert a projector between the current format A of FIG. 1 and the new format 12 of FIG. 4, by replacing one set of current sprocket wheels of FIG. 3, with a set of new sprocket wheels 14 of FIG. 5. The projectionist can convert back by replacing the new sprocket wheels with the current ones. Thus, applicant's new film format and new sprocket wheels, not only increase acceptance because of the relatively low cost for switching and because of assurance of film projection areas as large as current ones, but also assures the theater owner that he will be readily able to project both the current and new formats. The motion picture images can be initially "taken" or exposed with a camera that produces the present camera format A, wherein the film frames are spaced by four perforations. These images then can be transferred to release prints using the new format of 2.5 perforation spacing.

Although most current projectors use sprocket wheels with 16 teeth per revolution, there is one brand of projector that uses 24 teeth per revolution along with a 6-star Geneva movement that turns in 60° increments. That projector turns its shafts at a speed of 4 rps. For that projector, applicant supplies sprocket wheels having 15 teeth per revolution, in order to project film of the format 12 of FIG. 4.

Figure 6:
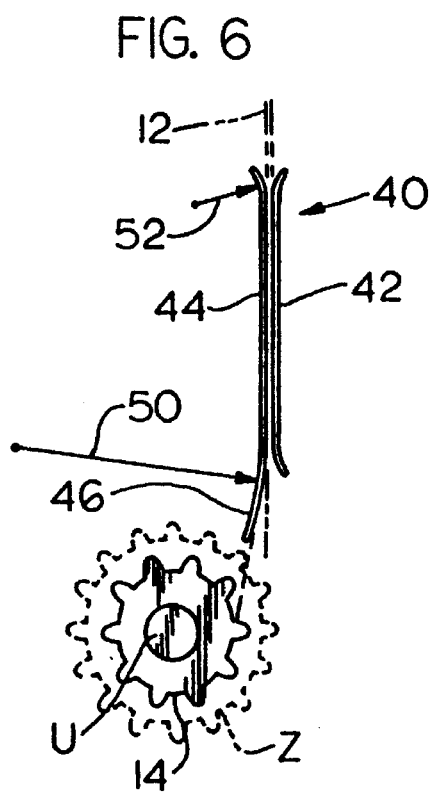
FIG. 6 is a partial side elevation view of the projector of FIG. 2, showing some modifications near the film gate.

FIG. 6 shows a new film gate 40 which is designed to be used with the new sprocket wheel 14. The new film gate includes a current rear plate 42, and a rearwardly-biased replacement front plate 44 that replaces a current front plate that was of the same shape as plate 42. Because of the fact that the new sprocket wheel 14 is of smaller diameter than the current one Z, the new film 12 will bend at the bottom of the film gate. The new front plate 44 has a lower end 46 that is curved at a greater radius of curvature 50 than that 52 of the current plate, to avoid damage to the tensioned film. It is noted that current projectors use a spring-biased keeper (not shown) at each sprocket wheel to keep film against the sprocket wheel. Applicant prefers to replace the keeper devices to account for decreased sprocket wheel diameter.

Figure 7:
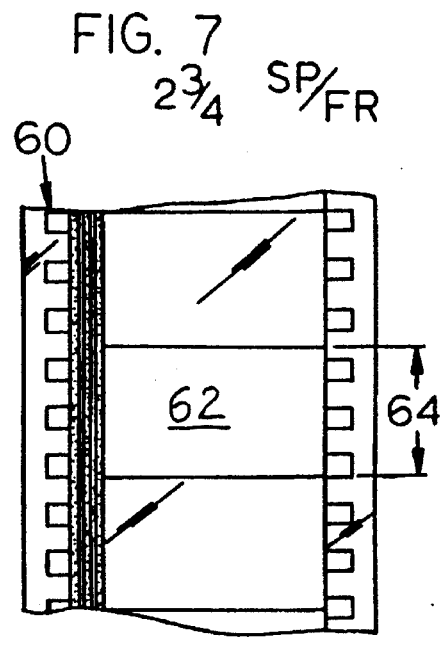
FIG. 7 is a front elevation view of a new motion picture film format of another embodiment of the invention, with film frames spaced apart by 2.75 perforations.
Figure 8:
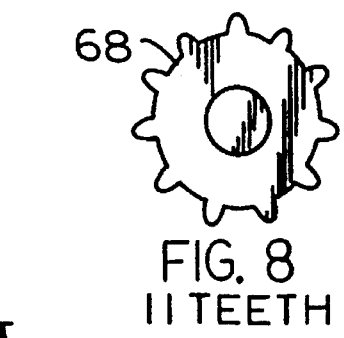
FIG. 8 is a side elevation view of a new sprocket wheel of the present invention which is used with the film format of FIG. 6.

FIG. 7 illustrates another new format 60 that uses current film stock, on which the film frames 62 are spaced apart by a distance 64 of two and three-fourths perforations, or 2.75 sprocket holes, or 0.51425 inch. If substantially the entire 0.51425 inch distance of each 2.75 perforation distance is occupied by the projection aperture, then applicant produces an aspect ratio of about 1.6:1. FIG. 8 shows a sprocket wheel 68 which has 11 teeth and which would replace the 16 tooth wheel Z of FIG. 3 if the film format 60 of FIG. 7 were projected.

Figure 9:
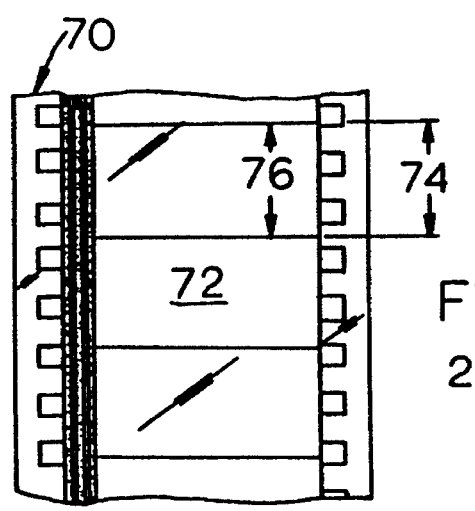
FIG. 9 is a front elevation view of a new motion picture film format of another embodiment of the invention, with film frames spaced apart by 2.25 perforations.
Figure 10:
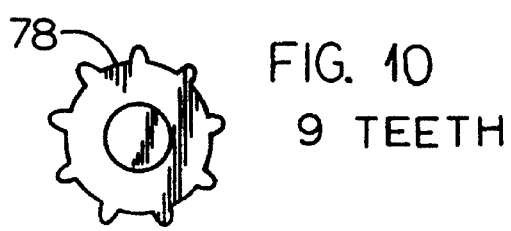
FIG. 10 is a side elevation view of a new sprocket wheel of the present invention which is used with the film format of FIG. 9.

FIG. 9 illustrates another new film format 70 that uses the same current film stock, but wherein the film frames 72 are spaced apart by a distance 74 of two and one-quarter perforations (2.25), or 0.41625 inch. The film frames each have a length 76 of 0.416 inch. This film can be used to produce an aspect ratio of 2:1. FIG. 10 shows a sprocket wheel 78 which has nine teeth and which would replace the 16 tooth wheel Z of FIG. 2 if the film format 70 of FIG. 9 were projected. Because the format 70 results in a smaller projection aperture, it can require considerable "selling" of this format to convince distributors and theater owners that, with the use of high resolution film and bright projection lamps, the image will be as good as that currently obtained.

The above describes formats where the film is advanced in noninteger steps of 2.5, 2.75 and 2.25 perforations. In a projector that currently has a 4-star Geneva movement and 16 tooth sprocket wheels, the conversion is made by substituting 10 tooth, 11 tooth, and 9 tooth sprocket wheels. As mentioned above, if a projector has a 6-star Geneva movement, 15 tooth sprocket wheels are used to advance by 2.5 perforations. For such Geneva movement, steps of 2.33 and 2.66 perforations can be obtained using 14 or 16 tooth wheels, respectively. Such steps can be useful to minimize waste where aspect ratios of 1.9 or 1.65 are desired.

A major advantage of applicant's new formats is that in saving film stock, they allow the use of film reels of smaller diameter. Currently, a motion picture film may be transported in four to eight reels of 2,000 feet capacity each to the theater owner, who splices them and places them on a single reel or platter for projection. With sufficient film stock saved, it is possible to transport an entire motion picture film as a single reel, which does not require splicing, to provide an additional advantage.

Although many film formats have been suggested, applicant is not aware of any suggestion that the distance between adjacent film frames equal a noninteger number of sprocket holes. Regardless of the particular frame height chosen (e.g. 2.5 perforations for the current projection aperture, a larger height for Cinemascope, less than 2.5 perforations for a new projection aperture, etc.), the possibility of using a noninteger frame spacing allows for maximizing usage of film stock.

Thus, the invention provides a readily acceptable motion picture system using current film stock, by providing a new film format which virtually eliminates "wasted" film, to meet the long recognized need to do so. The new film format can use film frames of substantially current usable height (0.467 inch) or projection aperture height (0.446 inch), but which are closely spaced or preferably contiguous, by spacing them by a noninteger number of perforations, or sprocket holes. A preferred format spaces the frames by 2.5 perforations. Conversion of most current projectors involves primarily the replacement of 16 tooth sprocket wheels with ten tooth sprocket wheels (or replacing 24 tooth wheels with a 15 tooth wheels). The preferred format, with film frames spaced by 2.5 perforations, results in virtually no "wastage" of film, which makes conversion to the preferred format more attractive than previous suggestions.

2. High Resolution Duplication

In the conventional motion picture post-production process, the original camera negative is transferred to an interpositive film through contact printing without any significant change in dimensions. The images then are transferred by a contact printing process from the interpositive to an internegative, with the internegative having the same dimensions as the original camera negative. The internegative is then used to produce multiple release prints. No significant change is made in the dimensions of the film frame or the positioning of the film frame relative to the perforations. However, because of the multiple transfers, there is generally some degradation of image resolution in each transfer. For example, the original camera negative typically has a resolution of sixty-eight line pairs per millimeter, the interpositive has fifty-two line pairs per millimeter, the internegative has forty line pairs per millimeter and the release print has thirty-six line pairs per millimeter.

In accordance with a further aspect of the present invention, a high resolution internegative film is produced for production of multiple high quality release prints of the new format. In one form of the invention, an interpositive is produced from the original camera negative by a contact printing process. The interpositive 102 (FIG. 10A) has essentially the same format as the original camera negative (FIG. 10A showing the current Wide Screen Academy film format). The interpositive 102 includes first and second film frames 104, 106 with a substantial interframe space 108 between them. Each frame corresponds to four perforations 110 on each side in the Kodak configuration. A space 112 is provided for a soundtrack to be incorporated on the final release print. The frame pitch and, therefore, the pull-down distance is 0.748 inch. The actual usable image height I' in the theatrical composition area of the interpositive is 0.446 inch which lies within the intended replication image height such as 0.46. In the following discussion, a replication height of 0.4665 will be assumed. Each frame has the same characteristics, and each succeeding frame represents the next image in time as recorded in the camera.

An improved internegative 114 (FIG. 11 A) is formed according to the present invention using an optical printer 66' such as that shown in FIG. 3A with the projector 68' having a standard projector head and the camera 76' having a modified printer lens 78'. The motion picture images are recorded on the internegative film in a consolidated format whereby the usable image area from the first image 104 is transferred to the internegative to form a first image 104A having an image height of 0.46 or 0.4665 inch and a width such as 0.868 inch (for Cinemascope, or "Scope", the current height is 0.735 inch and the width is 0.735 inch, while applicant's preferred frame has a height of 0.453 inch and width of 1.049 inch). The usable image information from the first film frame 104 is consolidated onto the internegative as a consolidated image without substantial reduction and without enlargement. The same replication occurs for the second image 106 and for each subsequent image thereafter. Therefore, each image has an image height I' such as 0.4665 inch. Magnification in the optical printer is preferably 1:1. The projector movement has a pull-down of 0.748 inch per standard frame of the interpositive and the projector head has an aperture size of 0.868 inch by 0.4665 inch.

In one preferred embodiment of the invention, described in more detail below, the actual optical printing transfer process occurs in two passes. During the first pass, the odd film frames (such as the first image 104 of FIG. 10A) on the interpositive are transferred. The first frame 104 and every other frame thereafter is transferred as the film is twice pulled down a distance P' of 0.7464 inch. In the second pass, the second film frame 106 on the interpositive and every other film frame thereafter is exposed in the same manner, with two pull-down strokes between each exposure. The camera head is modified to have a pull-down of 0.933 inch, corresponding to the height of two combined images 104A and 106A. Two apertures are used in the printer camera to achieve the consolidation according to this format, each aperture being 0.868 inch by 0.4665 inch. The bottom half aperture is used in the first pass to illuminate the internegative to record odd frames starting with the first usable image 104A. At the same time, the film area corresponding to the second image 106A is masked. After two pull-down strokes of the projector movement and one pull-down stroke of 0.933 inch of the camera movement, the next odd image is recorded. In the second or reverse pass, the top half aperture is used to record the even images including the second usable image 106A while at the same time masking the lower half previously recorded in the first pass. As with the first pass, the second film frame and every other film frame is exposed after two pull-down strokes in the projector head and recorded on the internegative after one pull-down stroke by the camera head.

In this first embodiment of the optical printer, the printer camera includes a film transport mechanism 116 (FIG. 12), a supply reel 118 and a take-up reel 120. A film guide 122 holds the film 124 stationary in conjunction with a pair of register pins 126, each register pin corresponding to one side of the motion picture film. A pull-down claw 128 advances the film after the film is disengaged from the register pins. In the present embodiment, the pull-down claw 128 has a stroke length or pitch P" of 0.933 inch (FIG. 11A).

In operation, the film guide 122 disengages the internegative film from the register pins 126 and the pull-down claw engages the film 124 (FIG. 13). The pull-down claw 128 then advances the film 0.933 inch, at which time the film guide 122 disengages the film from the pull-down claw and engages the film with the register pins 126 (FIG. 14). In the preferred embodiment, the film transport mechanism pulls the internegative film in the direction shown in FIG. 13 during the first pass, and then pulls the film in the reverse direction, a pitch of 0.933 inch in the opposite direction, during the second pass. Alternatively, the interpositive and the internegative film can be rewound to a second starting point corresponding to the second frame and the process begun again.

As referenced above with respect to FIG. 3A, the optical printer includes a vertical adjustment mechanism 84 to position or offset the projector 0.0467 inch above the printer centerline (FIG. 15) during the first pass for printing odd frames. The offset is indicated at 130 (FIG. 15). The offset line corresponds to the center of the standard 35 mm film frame. The 0.4665 inch usable image area is depicted by the left triangle 132 which is focused through a 1:1 stationary printer lens 134 through a 0.868 inch wide by 0.4665 inch high camera aperture for Wide Screen (1.049 inches wide by 0.4665 inch high for Scope) for exposing the corresponding image area on the internegative film. The aperture 136 (FIG. 17) is positioned so that the centerline is offset 0.0467 inch below the printer centerline. The image is recorded on the internegative offset from the printer centerline by the offset distance of 0.0467 inch. The interpositive is twice advanced 0.7464 inch while the internegative is advanced 0.933 inch.

On the second pass, even frames from the interpositive are recorded on the remaining frames of the internegative through the lens 134. For the second pass, the projector is moved downward so that the offset 130 is now 0.0467 inch below the printer centerline. The camera position 140 is maintained between the first pass and the second pass, but the internegative 35 mm film stock is shifted or advanced two perforations prior to the second pass. The net effect of lowering of the projector by a total of one-half perforation and the shifting of the internegative stock by two perforations is a 0.4665 inch shift which allows each of the second useable image frames from the interpositive to be recorded on the remaining film area corresponding to the 0.933 inch space to be occupied by two adjacent image frames. Prior to the second pass, the aperture 136 is reversed on the aperture centerline to the position corresponding to 136A shown in FIG. 17.

This embodiment for consolidating usable image information onto an internegative through a double-pass process whereby the projector is shifted between passes provides a convenient mechanism and procedure for precision transfer and consolidation of motion pictures from the conventional 35 mm current Wide Screen format to the new consolidated format on 35 mm film stock. Image resolution is enhanced with the present process over conventional transfers, and currently available precision equipment can be used to achieve accurate shifting of the projector between passes. Precision 0.933 inch pull-down for the printer camera can be accomplished by appropriate re-design of the camera movement, as would be apparent to one skilled in the art.

In an alternative embodiment of the optical printer (FIG. 18), the projector may be positioned 0.23325 inch above the printer centerline so that the usable image from the interpositive is recorded onto the lower half of the internegative film space. The raised position of the projector puts the centerline 142 of the interpositive film frame approximately 0.23325 inch above the printer centerline. The interpositive is then transported on a first pass in the same manner as described above, with odd film frames being recorded on the internegative on the lower portion of every increment of film space corresponding to five perforations the camera being centered on the printer centerline. Before the second pass, the camera aperture is reversed so that the aperture of 0.868 wide by 0.4665 inch high for Wide Screen (1.049 inches wide by 0.4665 inch high for Scope) extends above the printer line and the projector is lowered 0.4665 inch, corresponding to one full usable image frame, so that the even frames may be recorded on the internegative film.

In a further alternative embodiment of the optical printer (not shown), the projector remains stationary so that the vertical center of each interpositive film frame is centered on the printer centerline. The camera is vertically adjustable so that it can be offset for one or both of the first and second passes. In the preferred embodiment, the camera is offset 0.04665 inch above the printer centerline to expose the odd numbered images from the interpositive during the first pass.

Prior to the second pass, the camera is moved downward to be offset 0.04665 inch below the printer centerline, and the internegative film is advanced 0.3732 inch (two perforations) so that the even frames of the internegative are exposed during the second pass. The camera aperture is also turned over in a north/south direction to expose the upper film area in the camera as discussed above. For the second pass, the internegative is advanced 0.3732 inch and exposed while running in the reverse direction, or rewound and advanced 0.3732 inch to frame 106A, as discussed above.

While the printing means and process described herein reference dimensions corresponding to consolidation of Wide Screen images, similar apparatus and methods are also used to consolidate Scope images.

Other mechanical arrangements can be made for consolidating the usable images from the 35 mm interpositive onto the 35 mm internegative wherein the frame pitch is the preferred 0.4665 inch and the preferred effective pull-down is 0.4665 inch. Therefore, in a further embodiment of the printer camera film transport, the camera head includes a supply reel 144 and a take-up reel 146 for transporting the internegative film stock 148 through a film gate 150 (FIG. 19) for properly recording the usable image area according to the preferred consolidated format. The internegative film is registered in the film gate for proper recording by first and second pairs of registration pins 152 and 154, respectively. The second pair 154 of registration pins is positioned one and one-half perforations below the first pair of registration pins 152. These dual registration pins are spaced one and one-half perforation pitch or distance apart to properly register alternately a first film frame on which is recorded the first image and thereafter properly register the second film frame on which is recorded the next succeeding usable image. The mechanism of FIG. 19 is used to properly register the internegative film as sequential images from the interpositive are recorded thereon in a single pass. The dual registration pin arrangement accounts for the effective 0.4665 inch pitch or film pull-down, resulting from the consolidation according to the present invention.

A pull-down claw 156 (a sprocket wheel can be used instead) advances the film 148 0.4665 inch with each stroke. However, because this pull-down stroke of 0.4665 inch corresponds in 35 mm film stock to two and one-half perforations, the start and end points of the pull-down claw 156 alternate, and the pull-down claw shuttles back and forth between the two start positions with each stroke. For example, in a first stroke to advance the film a distance of 0.4665 inch, the film gate 150 engages the film with the pull-down claw 156 at position A1 and disengages the film from the first pair of registration pins 152. The pull-down claw 156 advances the film through the film gate the 0.4665 inch distance to position A2. Therefore, the next succeeding film frame is positioned before the aperture 158 (FIG. 24) in the film gate. Because the film is advanced a fractional number of perforations for 35 mm film stock, no pair of sprocket holes will be positioned then in front of the first pair of registration pins 152 but there will be a pair of perforations then positioned in front of the second pair of registration pins 154 which are positioned one and one-half perforations below the first pair of registrations pins. As a result, the film gate engages the film with the second pair of perforation pins 154 while the first pair of registration pins remain disengaged (FIG. 21). At the same time, the film gate disengages the film from the pull-down claw 156. The pull-down claw 156 returns upward to a position B1 one-half perforation above its original starting position to engage the next pair of perforations. There are no pairs of perforations located at the position A1 from which the pull-down claw started since the film was advanced only two and a half perforations. The film gate then engages the film with the pull-down claw 156 while the first and second pairs of registration pins are disengaged. The pull-down claw then advances the film to position B2 another 0.4665 inch increment to once again position a pair of sprocket holes in front of the first pair of registration pins (FIG. 22). The pull-down claw then shuttles between positions A1–A2 and B1–B2.

Figure 23:
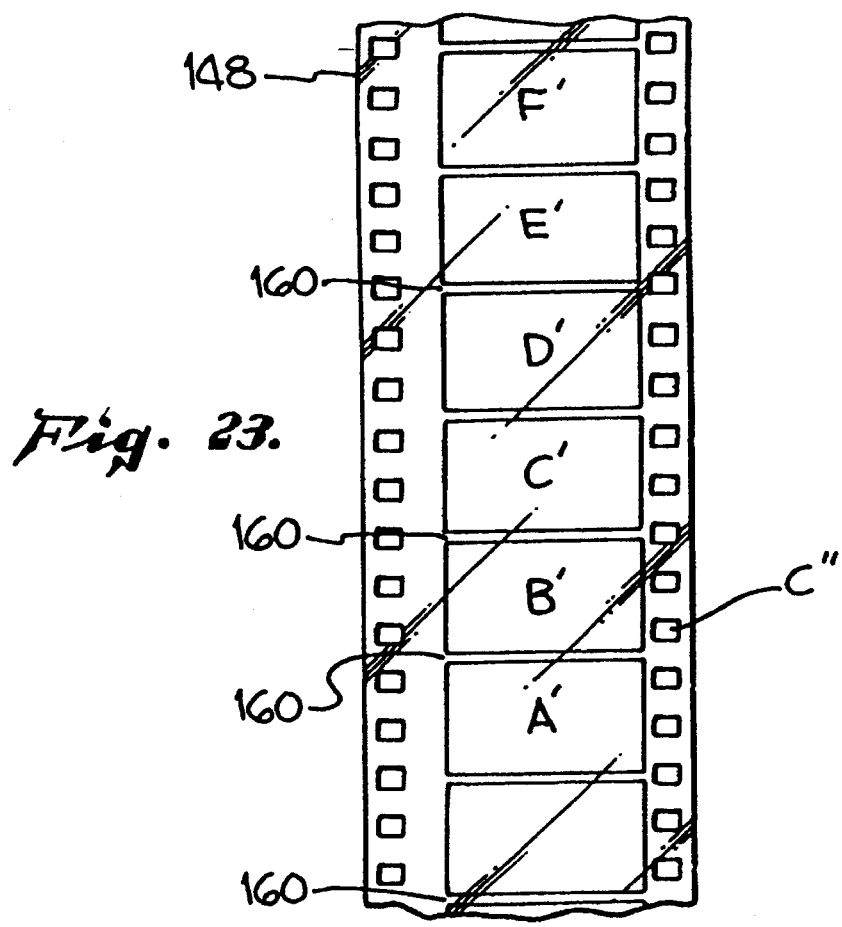
FIG. 23 is a plan view of a segment of motion picture film showing a relationship between an exposed image area and registration pin placement using a dual pin registration system for an optical printer camera head according to one aspect of the present invention.
Figure 24:
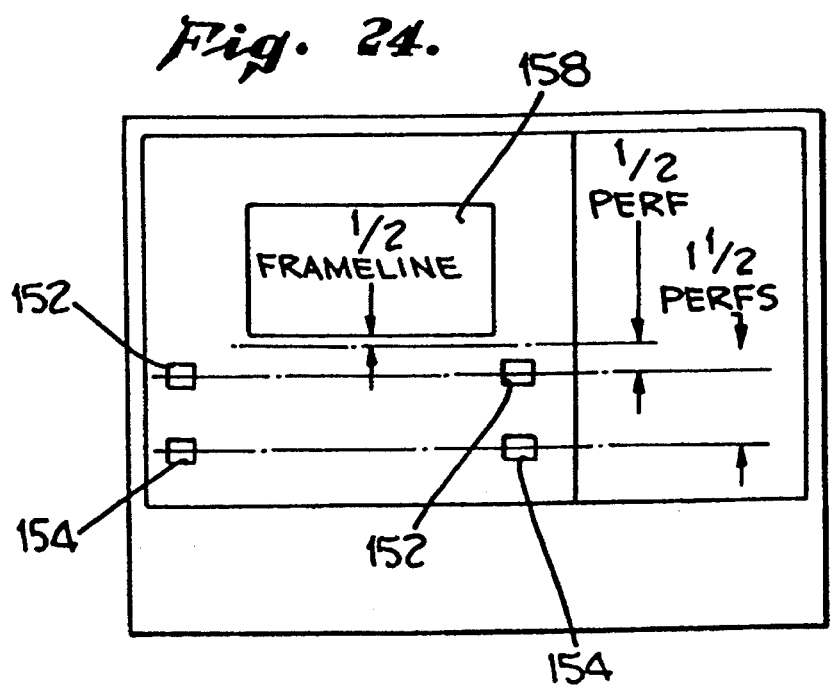
FIG. 24 is a schematic and plan view of a film gate for an optical printer camera head using dual pin registration.

The advancement and sequential registration of pins with corresponding sets of sprocket holes in the internegative film can be seen in FIGS. 23 and 24. In considering the internegative film of FIG. 23, it should be noted also that in the preferred embodiment using 35 mm film stock, the bottom of each consolidated film frame falls either precisely on a perforation, such as Frames A', C', E', and so on, or precisely on a line extending half way between perforations, namely Frames B', D', F' and so on. It should be noted also that the frame lines 160 are shown in an exaggerated form for clarity. However, it should be understood that the space constituting the frame lines 160 is minimal. In order to register each frame as the frame is presented in the film gate, the registration pins preferably engage sprocket holes above or below the film frame so that engagement of the film with the registration pins do not distort the film frame being exposed. Moreover, it is desirable to have the registration pins as close as possible to the film frame to be exposed. Therefore, to register the Frames B', D', F' and so on, the first pair of oppositely disposed sprocket holes below the frame line between Frames A' and B' are used. For Frame B', the first registration pin pair 152 (FIG. 24) registers film Frame B'. The first registration pin pair 152 is positioned a distance below the bottom edge of the aperture 158 equal to one half of the perforation pitch (the distance between adjacent perforations) and a half frame line. Therefore, the pull-down claw 156 (FIGS. 19–22) advances the internegative film 148 a distance of 0.4665 inch. When the film reaches its new position, sprocket holes will not be aligned with the first registration pin pair 152 but only with the second registration pin pair 154. The second registration pin pair is positioned in the film gate below the aperture 158 a distance approximately equal to 0.4665 inch plus the increment of one-half frame line so that the second pair of registration pins engage the sprocket holes designated by the letter C" (FIG. 23). The first pair of registration pins 152, therefore, engage the first sprocket holes below each film frame whose lower frame line falls between adjacent sprocket holes (Frames B', D', F'), while the second registration pin pair 154 engage the second full sprocket holes below the lower frame lines of those frame whose frame lines fall on a sprocket hole (Frames A', C', E').

It should be noted that the frame lines may fall elsewhere between perforations, but the alternating "at" and "between" arrangement is preferred because splices can be more easily made with the frame lines positioned as disclosed. Additionally, replication and consolidation can be more precise where frame lines are positioned precisely "at" and "between" perforations.

Using the dual pin registration arrangement, consolidation of usable film images on an internegative film strip using an optical printer avoids the multiple pass consolidation process. The dual pin registration system also avoids adjustment of the printer projector or camera in order to properly position the usable images on the internegative film stock in the optical printer camera. However, as with the double pass consolidation process, the dual pin registration arrangement allows accurate printing of the consolidated images on the internegative film stock to reduce film waste, and to reduce the total film length required for a feature length motion picture. Other arrangements may also be used.

The process described above for creating a 35 mm release print produces images having a resolution of approximately 42 line pairs per millimeter. This resolution is improved relative to the resolution of conventional prints, at approximately 36 line pairs per millimeter. However, in a further embodiment of the present invention, image resolution for release prints can be increased to approximately 50 line pairs per millimeter through a dual optical printer process whereby an interpositive is produced from the original camera negative in an optical printer enlarging the images substantially two times onto 65 mm film in an optical printer, after which an interpositive is produced onto 35 mm film through a substantially 2:1 reduction in an optical printer. The final release print is then produced in a contact printer resulting in a resolution of approximately 50 line pairs per millimeter.

Figure 25:
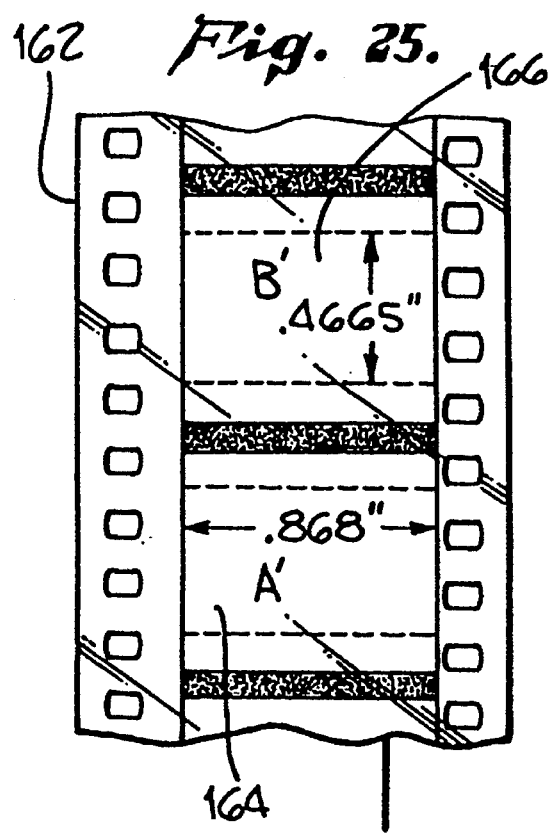
FIG. 25 is a plan view of a segment of 35 mm motion picture film according to conventional Wide Screen standards to be used in a consolidation process according to the present invention.
Figure 27:
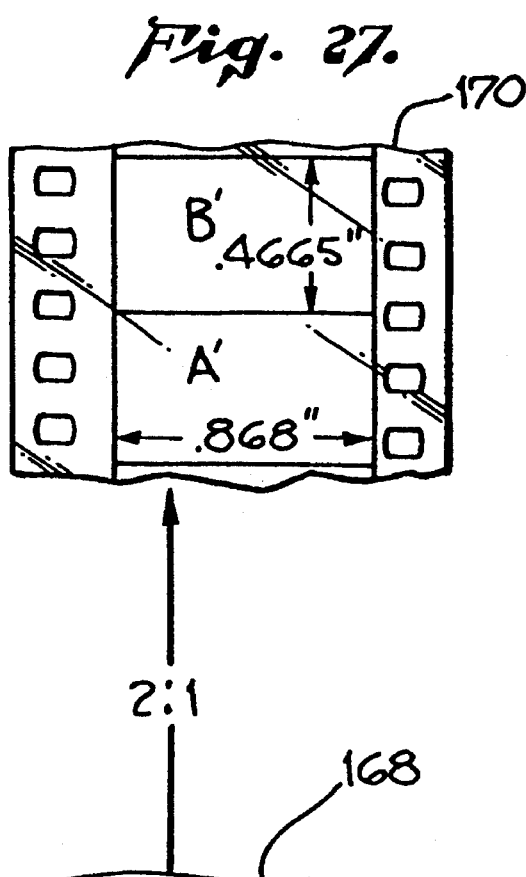
FIG. 27 is a plan view of a segment of motion picture film containing the consolidated images taken from the film of FIG. 26 reduced by a factor of two.
Figure 26:
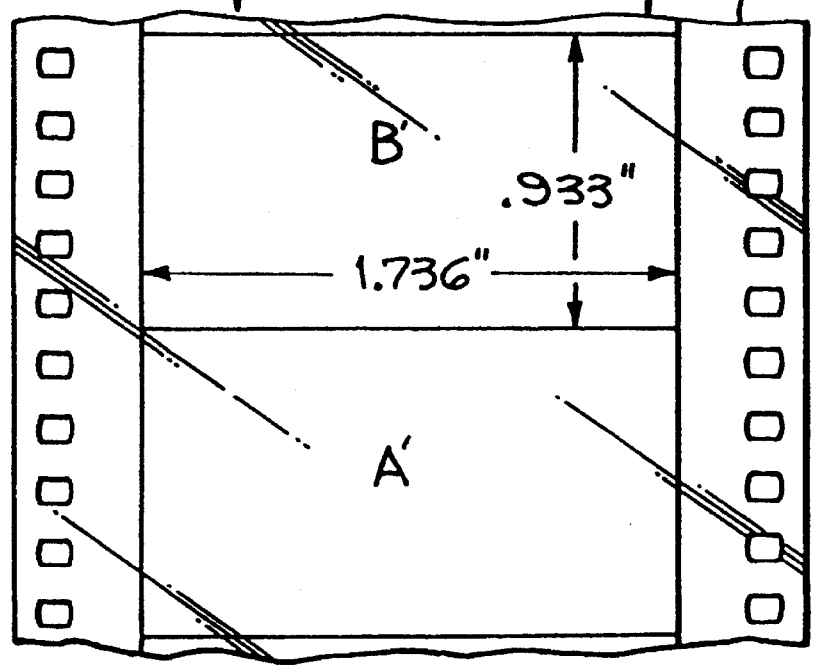
FIG. 26 is a plan view of a segment of 65 mm film with the usable images from the film of FIG. 25 enlarged two times.

In accordance with a further aspect of the present invention (FIGS. 25–27), 35 mm original camera negative film 162 in the conventional Wide Screen format includes a plurality of frames such as first frame 164 and second frame 166 having the conventional dimensions. The usable image area corresponding to the dimensions 0.868 inch by 0.4665 inch is transferred in an optical printer such as that described above but wherein the usable image is enlarged two times onto 65 mm film 168 in an area 1.736 inches by 0.0933 inch (FIG. 26). The usable images are preferably placed on the 65 mm film without any substantial interframe space so that each subsequent frame is closely adjacent to the preceding frame. The usable images on the interpositive are then reduced in an optical printer at a ration of 2:1 onto 35 mm internegative film 170 wherein each frame occupies an area of 0.868 inch by 0.4665 inch. The internegative film has the same format and frame configuration as the internegative 114 previously described (FIG. 11A). Specifically, the frame pitch is 0.4665 inch. There is very little, if any, interframe space and each frame is closely adjacent to the immediately preceding frame to minimize film waste. The internegative can then be used to produce, through a contact printer, release prints in the consolidated format which would allow for theater projection automation and which has better image resolution and greater screen definition. Significantly, the image resolution is greater in the prints developed by the process described with respect to FIGS. 25–27 because there is negligible loss of image resolution in the enlargement process going to the 65 mm film from original camera negative to interpositive.

Similar increased image resolution can be achieved with motion pictures filmed in the Scope format by enlargement from the original camera negative to the interpositive and subsequent reduction from the interpositive to the internegative (FIGS. 28–30). Specifically, original camera negative Scope film 172 (FIG. 28) in the conventional format includes usable image information in the area defined by the 0.980 inch by 0.423 inch area on each frame 174. Each usable Scope image from the original camera negative 172 is enlarged 1:2.141 in an optical printer having a printer lens onto 65 mm film 176 whereon the enlarged images 178 are 2.098 inch by 0.906 inch. As with the current Wide Screen format, each image is recorded closely adjacent to the immediately preceding image and there is negligible change in image resolution with the enlargement. The interpositive is then reduced 2:1 in an optical printer having a printer lens onto a 35 mm internegative film 180 (FIG. 30) within an image boundary or frame 182 1.049 inches by 0.453 inch with negligible interframe space. The internegative 180 includes Fox perforations 184 to accommodate the 1.049 inches width of the frame. The frame pitch is 0.453 inch while the pull-down pitch is preferably still 0.4665 inch. As with the similar Wide Screen process, the Scope enlargement and reduction process produces motion picture film having higher image resolution and screen definition. The process also reduces film waste and provides a film release print which allows full theater automation.

Figure 31:
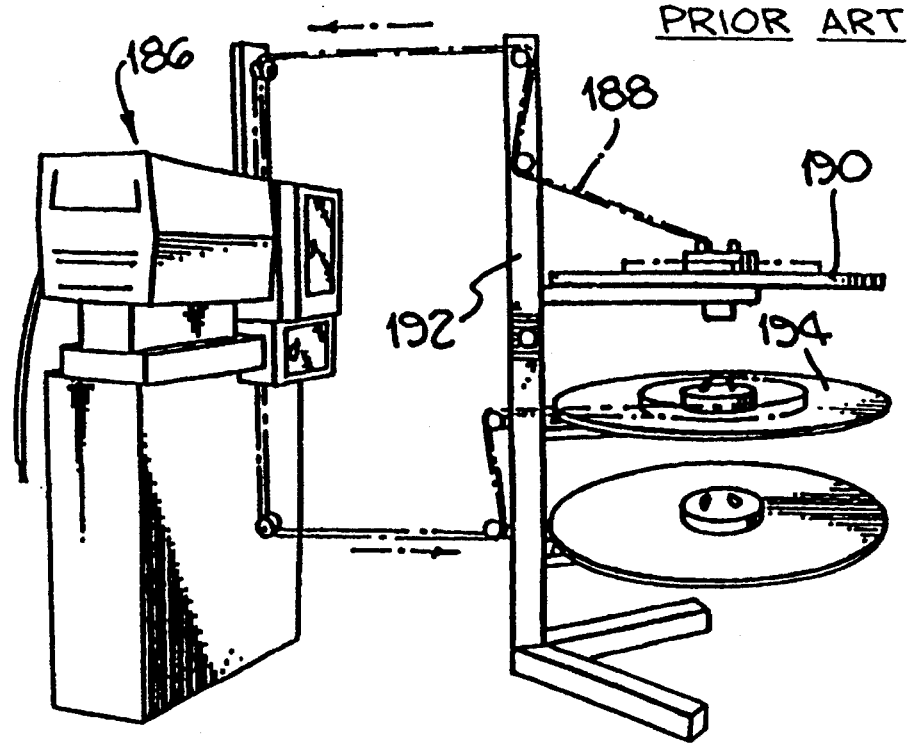
FIG. 31 is a schematic of a conventional platter projection system in common use.

Significant benefits to the projection and exhibition of motion picture films flow from the film format of the present invention. Significant savings in film stock consumption result when multiple release prints are produced from the internegative of the present invention. The shorter release prints allow a feature length motion picture to be placed on a single reel, and also allow full automation in exhibition of feature length motion picture films. In prior projection systems such as the platter system (FIG. 31), a projector 186 has a film 188 threaded through it. An upper platter 190 is mounted on a feeder stand 192 to supply film to the projector. After the film passes through the projector, it is fed to a lower platter 194 similarly supported by the feeder stand 192. After each showing of the film 188, the film must be rethreaded through the projector. A trained projection attendant must typically re-thread the film after each showing and start the projector. Additionally, feature length motion picture films typically come in four or more reels each containing approximately 2,000 ft. lengths of film. These segments must be spliced together in proper order onto the platters or, in the case of reel projectors, threaded onto one of several large reels. These projection systems require significant attention by projection personnel. When all of the screenings of the film have been completed, the film is then wound back onto the original reels after the splices are removed. The content of the film often requires repeated adjustments during a single play, for example, where previews are shown with the masking on the projector partially opened, after which full opening of the masking occurs at the beginning of the feature film.

Figure 32:
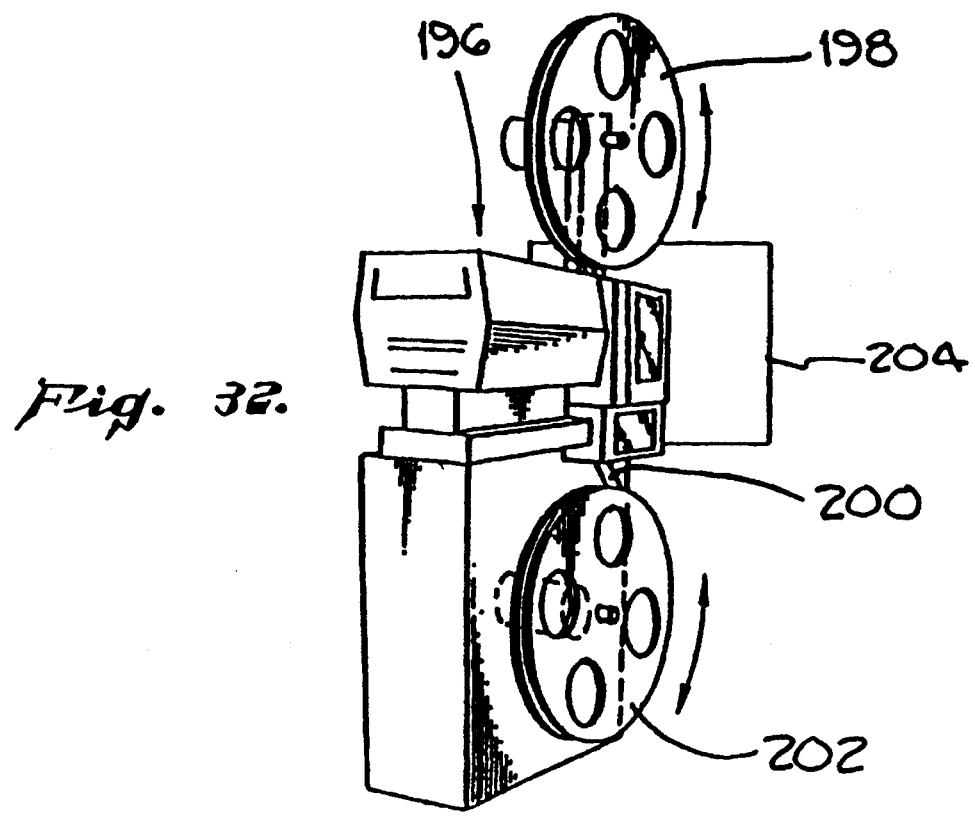
FIG. 32 is a perspective view of a projection system according to a further aspect of the present invention.

In accordance with a further aspect of the present invention, a projection assembly 196 (FIG. 32) includes a standard 26 inch supply reel 198 of film 200 which is then fed onto a take up reel 202. The images are projected onto a standard screen 204, described more fully below. In the preferred embodiment, the consolidated motion picture film of the present invention can be provided on a single reel and would include a suitable reverse code at the end of the film to stop the projector and rewind the film at a linear speed of 600 to 800 feet per minute.

The projector is modified according to the present invention by removing the standard drive sprocket 206 (FIG. 33) having a circumferential arc length AA between teeth of 0.187 inch, corresponding to an arc BB of 22.5°, having a tooth base height CC of 0.078 inch and a radius DD of 0.4762 inch. This prior art sprocket was used to drive the conventional 35 mm film having four perforations per frame. This drive sprocket is substituted with a smaller drive sprocket 208 (FIG. 34) having a circumferential arc length AA between adjacent teeth of 0.187 inch and arc BB of 36°. The base height CC of the teeth is 0.078 inch while the radius EE is 0.2976 inch. The sprocket is driven so as to present a new film image to the film gate aperture at the standard film frame rate, namely 24 frames per second. However, with the consolidated print, the film speed or projection speed is 56.25 feet per minute, compared to the conventional 90 feet per minute with present film prints.

The projector is further simplified by eliminating the cylindrical lenses required for Scope projection, thereby increasing the light output from the projector for Scope projections. The enlargement of 1:2.141 and reduction of 1:2 used in creating and going from the 65 mm Scope interpositive to the internegative allow the use of spherical lenses to show a Scope film.

Sound reproduction is dramatically enhanced when digital recording and playback are used with the film formats of the present invention and the film is run at 56.25 feet per minute. In the preferred embodiment of the final release prints for Wide Screen format (FIG. 35), the release print 211 preferably includes an analog stereo sound track 210 and a SMPTE time code track 212 common in the industry. The perforations 214 are the conventional Kodak 35 mm film perforations spaced and oriented in the same configuration. However, the consolidated frames 216 are arranged so as to have the 0.4675 inch pitch. Every other inter-frame line falls "at" a perforation while the remaining interframe lines coincide with the space "between" adjacent perforations. The release print may also include a bar code 218 common in the art containing information regarding film type, film rate, end of film, and the like. The 35 mm consolidated release print 220 (FIG. 36) includes the SMPTE time code 222 and Fox perforations 224 and the bar code 226. The Scope size of frames 228 also have an effective 0.4675 inch pitch. The Scope release print omits the analog sound track but may include a digital inter-perforation sound track 230. Alternatively, a separate digital sound track can be recorded on another medium which can then be synchronized using the SMPTE time code.

The projector includes a wide screen aperture 232 (FIG. 37) having Wide Screen opening dimensions 0.829 inch by 0.446 inch. The projector also includes the aperture 234 (FIG. 38) having Scope opening dimensions of 1.049 inches by 0.446 inch. The aspect ratio of the wide screen aperture is 1.85:1 and the aspect ratio of the Scope aperture is 2.35:1. The wide screen projected image illuminates a typical 27.75 foot by 15 foot high screen 236 (FIG. 39) while the Scope aperture illuminates a typical 35.25 foot by 15 foot high screen 238. As discussed above, the higher resolution images from the consolidated prints produce a higher screen definition. A Wide Screen spherical lens and a typical 75 foot throw produces a 2.23 inch E.F. (E.F. equals the throw divided by the screen height multiplied by the film image height). The Scope spherical lens produces 2.23 inch E.F. with a typical 75 foot throw.

In a further form of the optical printer (FIG. 40), a stationary printer projector represented schematically at 240 passes an interpositive film at a 0.7464 inch pull-down pitch so that the usable image area of 0.4665 inch can be projected through a movable lens 242 and onto a substantially 0.4665 inch film frame on an internegative advanced through a stationary printer camera represented schematically at 244. The printer camera advances the internegative film at a pull-down pitch of 0.933 inch. The movable lens 240 is adjustable to a first off-set position preferably 0.0233 inch south of the printer centerline during a first pass of the interpositive and internegative film strips, to expose "odd" film frames onto the internegative. After the first pass is completed, the lens is off-set above the printer centerline, preferably 0.0233 inch north, while the internegative is advanced 0.3732 inch (e.g., two perforations on 35 mm film) before beginning the second pass so the "even" film frames can be projected onto the remaining portions of the internegative film stock. The camera aperture configurations are preferably the same as those shown in FIG. 17 for the corresponding first and second film passes.

In an alternative embodiment of the optical printer of FIG. 40, the printer projector 240, the printer lens 242 and the printer camera 244 are maintained stationary on the printer centerline and the usable images from the interpositive film are projected onto the 0.4665 inch frame on the internegative film stock with the "odd" frames being transferred in a first pass. At the end of the first pass, the positive and negative film rolls are turned over and rethreaded with the "even" frames of the interpositive film on the optical center of the printer, and with the internegative stock rethreaded so that the frames fall on the same center as previously configured. The interpositive and internegative film rolls are rotated in an "east/west" direction so that the film emulsions are still face-to-face. The unexposed portions of the internegative are centered on a 0.980 inch wide by 0.4665 inch high aperture vertically centered on the printer centerline. "Even" frames are then printed onto the internegative film stock.

Table I shows a comparison of film formats, projection characteristics and exhibition characteristics for prior film formats and for the present invention. Table II shows various advantages of the present invention over the prior film formats.

Although particular embodiments of the invention have been described and illustrated herein, it is recognized that modifications and variations may readily occur to those skilled in the art, and consequently, it is intended that the claims be interpreted to cover such modifications and equivalents.

TABLE I

|  | PRIOR FORMATS | PRESENT INVENTION |
|---|---|---|
| 1.85:1 Wide Screen Film | | |
| Camera (35mm) | .868" × .631" | Same |
| Academy) | .825" × .446" Composition | Same |
| Interpositive (35 mm) | .868" × .631" Contact | Same |
| Interpositive (65 mm) | N/A | 1.736" × .933", 1:2 35 mm to 65 mm opt. Replication |
| Internegative (35 mm) | .868" × .631" Contact | .868" × .4665", 1:1 35 mm to 35 mm opt. Replication |
| Internegative (35 mm) | N/A | .868" × .4665", 2:1 65 mm to 35 mm opt Replication |
| Release Print (35 mm) | .868" × .631" Contact | .868" × .4675" Contact, Kodak Pf. |
| 2.35:1 Scope Film | | |
| Camera (35 mm Full | .980" × .735" | Same |

TABLE I-continued

|  | PRIOR FORMATS | PRESENT INVENTION |
|---|---|---|
| Academy) | .980" × .423" Composition | Same |
| Interpositive (35 mm) | N/A | .980" × .735", Contact |
| Interpositive (65 mm) | N/A | 2.098" × .906", 1:2.14 35 mm to 65 mm opt. Replication |
| Internegative (35 mm) | N/A | 1.049" × .453", 1:1.07 35 mm to 35 mm opt. Replication Fox Pf. |
| Internegative (35 mm) | N/A | 1.049" × .453", 2:1 65 mm to 35 mm opt. Replication Fox Pf. |
| Release Print (35 mm) Projection | .868" × .735" Contact | 1.049" × .453", Contact, Fox Perf. |
| Pulldown | .748" Per Frame | .4675" Per Frame |
| Speed | 90 Ft. Per Minute | 56 ¼ Ft. Per Minute |
| Print Length (100 Minutes) | 9000 Feet (Multiple Reel) | 5625 Feet (Single Reel) |
| Aperture Size (Wide Screen) | .825" × .446" | .825" × .446" |
| Aperture Size (Scope) | .838" × .735" (Anamorphic) | 1.049" × .446" (Flat) |
| Lens (Wide Screen) | Spherical | Spherical |
| Lens (Scope) | Anamorphic | Spherical |
| Aspect Ratio (Wide Screen) | 1.85:1 | 1:85:1 |
| Aspect Ratio (Scope) | 2:35:1 | 2:35:1 |
| Automation | Partial | Full |
| Screen (Typical) | | |
| Wide Screen | 27.75 Ft. × 15 Ft. | 27.75 Ft. × 15 Ft. |
| Scope | 35.25 Ft. × 15 Ft. | 35.25 Ft. × 15 Ft. |
| Sound | | |
| Wide Screen | Analog on Film Digital on Film N/A | Analog on Film Digital on Film Digital (Separate) |
| Scope | Analog on Film Digital on Film | Digital (Separate) Digital on Film |

TABLE II

35 MM FILM, PRINT AND PROJECTION SPECIFICATIONS OF CONVENTIONAL PRACTICE AND OF THE INVENTION

| Image, Film, Print, Projection | Standard | Invention | Ratio Academy: Invention | Invention Advantage |
|---|---|---|---|---|
| Image Size of Orig. Neg. | 0.631" × 0.868" | — | — | — |
| Image Area of Orig. Neg. | 0.548 sq. in. | — | — | — |
| Useful Wide Screen Image Size of Orig. Neg. | 0.446" × 0.825" | 0.446" × 0.825" | 1:1 | Same Size |
| Useful Wide Screen Image Area of Orig. Neg. | 0.368 sq. in. | 0.368 sq. in. | 1:1 | Same Size |
| Frame Pitch | 0.748" | 0.4675" | 1:0.625 | Less Film (37.5%) |
| Frames Per Foot | 16 | 25.60 | 1:1.60 | More Frames/Ft (60%) |
| Non-Useful Image Space Between Useful Frames | 0.302" | 0.0215" | 1:0.071 | Less Waste (93%) |
| Print Length (100 min.) | 9000' | 5625' | 1:0.625 | Less Film (37.5%) |
| Projector Pull Down Pitch | 0.747" | 0.4675 | 10.625 | Less Velocity (37.5%) |
| Frame Transport Rate (frames/sec.) | 24 | 24 | 1:1 | Same Presentation |
| Film Transport Rate (ft./min.) | 90' | 56.25' | 1:0.625 | Less Film (37.5%) |
| Typ. Screen Size (1.85:1) | 15' × 27.75' | 15' × 27.75' | 1:1 | Same Screen |
| Projection Lens (spherical) (75' proj. throw) | E.F. = 2.23" | E.F. = 2.23" | 1:1 | Same Lens |
| Print Yield, Distribution (per | 111 prints | 178 prints | 1:1.60 | More Prints (60%) |

TABLE II-continued

**35 MM FILM, PRINT AND PROJECTION SPECIFICATIONS
OF CONVENTIONAL PRACTICE AND OF THE INVENTION**

| Image, Film, Print, Projection | Standard | Invention | Ratio Academy: Invention | Invention Advantage |
|---|---|---|---|---|
| 1 million print feet) Economy (cost per print) | $1200 | $750 | 1:0.625 | Less Expense (37.5%) |

I claim:

1. A new commercial theater motion picture distribution film for projecting onto a theater screen, comprising a length of substantially standard 35 mm film stock that has two rows of perforations wherein the perforation spacing distance is uniform and substantially 0.187 inch along each row, and which has new film frames spaced along the length of the film, wherein:

said new film frames each have a height of about 0.46 inch and are spaced apart by two times said perforation spacing distance plus a fraction of said perforation spacing distance, whereby to enable a choice of frame spacing that maximizes usage of film stock.

2. The film described in claim 1 wherein:

said frames each have a height of about 2.5 perforations and are spaced apart by 2.5 times said perforation spacing distance, or substantially 0.4675 inch, whereby said film frames occupy close to 100% of the length of the film.

3. The film described in claim 2 wherein said film is designed to be projected at a rate of 24 frames per second by a projector that has sprocket wheel shafts that turn at 6 rps and that can hold old sprocket wheels with 16 teeth per 360°, including:

a film projector that has a plurality of sprocket wheel shafts which turn at 6 rps;

a plurality of sprocket wheels each mounted on one of said shafts, with each sprocket wheel having 10 sprocket teeth per revolution, and with said 10 teeth sprocket wheels each having a diameter that is 62.5% of the diameter of said 16 teeth sprocket wheels.

4. The film described in claim 2 including:

a film projector that has a plurality of sprocket wheel shafts which turn at 4 rps and that are each designed to hold old sprocket wheels that each have 24 teeth;

a plurality of sprocket wheels each mounted on one of said shafts, with each sprocket wheel having 15 sprocket teeth per revolution, and with said 15 teeth sprocket wheels each having a diameter that is 62.5% of the diameter of said 24 teeth sprocket wheels.

5. A new commercial theater motion picture distribution film comprising a length of substantially standard 35 mm film stock that has two rows of perforations wherein the perforations are spaced substantially 0.187 inch apart along each row, and which has new film frames each of about 0.46 inch length along the length of the film, wherein:

said new film frames are spaced apart by two and one-half perforations, or substantially 0.467 inch, along the length of said film stock.

6. The film described in claim 5 including:

a projector for projecting said film stock, said projector having a plurality of sprocket wheels and at least one motor which is coupled to said sprocket wheels and which turns them at 6 rps, with each of said sprocket wheels having ten sprocket teeth per 360°, with said ten sprocket teeth wheels each having a diameter of 0.60 inch.

7. A motion picture theater distribution film strip comprising:

a continuous length of 35 mm film having a multiplicity of edge perforations, with a plurality of said edge perforations having a predetermined center-to-center perforation spacing of substantially 0.187 inch and having a plurality of picture frames spaced along the length of the film, wherein said picture frames are spaced by a plurality of said perforation spacings plus a fraction of a perforation spacing;

said picture frames are spaced apart by a number of said perforation spacings which is chosen from the group that consists of 2.25, 2.50, and 2.75 perforations.

8. The film strip described in claim 7 including:

means for projecting said film, which includes a film gate, a ten tooth sprocket wheel, and means for turning said ten tooth wheel in 90° steps.

9. A method for producing and projecting a commercial motion picture image, by creating a new motion picture release film on substantially standard 35 mm film stock that has perforations spaced substantially 0.187 inch apart along the length of the film, and by projecting new film frames of said new release film on a screen using a projector of common construction that has film-engaging sprocket wheels that are mounted on shafts and that has at least one motor that turns each of said sprocket wheels by a predetermined fraction of a turn every twenty-fourth of a second, where said shafts each could hold current sprocket wheels with a predetermined number of sprocket teeth per 360° to project current film wherein the current film frames each have a length of about 0.46 inch and the current film frames have leading edges spaced four sprocket holes, or substantially 0.748 inch, along the length of the film, comprising:

creating said new motion picture film with new film frames, but with the leading edges of said new film frames spaced apart by a noninteger number of perforations that consists of 2.25, 2.50, and 2.75 perforations;

establishing sprocket wheels on said shafts, that each have sprocket teeth with a circumferential spacing of substantially 0.187 inch, and with the number of sprocket teeth per 360° being chosen to advance said film by said noninteger number of perforations every twenty-fourth second when said wheel turns by said predetermined fraction of a turn.

10. The method described in claim 9 wherein:

said step of creating said new motion picture film includes creating said new film frames so their leading edges are spaced apart by 2.5 perforations, or substantially 0.467 inch, and said step of projecting includes turning a sprocket wheel that has 10 teeth, in steps of 90°.

11. A method for producing and projecting a commercial theater motion picture image, comprising:

creating an original motion picture film, including using a camera to record images on standard 35 mm film stock with a sprocket hole, or perforation, spacing of substantially 0.187 inch, with the images thereon spaced apart by a whole number, or integer number, of perforations, which is chosen from the group which is chosen from the group which consists of 3 and 4;

transferring at least portions of each of the images on said original film to a plurality of release prints that each comprises said standard 35 mm film stock, including establishing said images on each of said release prints so said images are spaced apart thereon by a noninteger number of perforations which consists of 2.25, 2.50, and 2.75 perforations.

12. The method described in claim 11 wherein:

said integer number is four, and said noninteger number consists of 2.25, 2.50, and 2.75 perforations.

13. The method described in claim 11 wherein:

said noninteger number is 2.5.

14. A method for taking and projecting a commercial motion picture image, comprising:

using a camera to photograph said motion picture image on a first length of substantially standard 35 mm film stock that has perforations spaced substantially 0.187 inch apart along the length of the film stock, by producing camera film frames on said film stock wherein said camera film frames contain images and said camera film frames are spaced apart by 4 perforations along the length of the film stock; and producing a plurality of distribution prints on a second length of substantially standard 35 mm film stock that has perforations spaced substantially 0.187 inch apart along the length of the film stock, wherein said distribution prints each have projection film frames and wherein said projection film frames contain at least portions of the images on said camera film frames, but wherein said projection film frames are spaced apart by 2.5 perforations along the length of said second length of film stock.

15. The method described in claim 14 including:

projecting said distribution print on a screen, including turning a sprocket wheel that contains 10 teeth per 360°, and that has a film-engaging periphery with a diameter of substantially 0.6 inch in 90° steps to advance said distribution print in steps that are each 2.5 perforations long past a film gate, and directing light through one of said projection film frames at each of said steps.

* * * * *